United States Patent [19]
Tamaki et al.

[11] Patent Number: 5,193,186
[45] Date of Patent: Mar. 9, 1993

[54] PROCESSOR SYSTEM FOR EXECUTING PROCESSES IN PARALLEL UNDER MULTITASK, CONTROL METHOD OF WAITING FOR EVENT OF PROCESS

[75] Inventors: Yoshiko Tamaki, Kunitachi; Katsuyoshi Kitai, Hadano; Yasuhiro Inagami, Kodaira; Yoshikazu Tanaka, Omiya, all of Japan

[73] Assignee: Hitachi, Ltd., Tokyo, Japan

[21] Appl. No.: 647,754

[22] Filed: Jan. 30, 1991

[30] Foreign Application Priority Data

Feb. 5, 1990 [JP] Japan .................. 2-026449

[51] Int. Cl.⁵ .............................................. G06F 9/06
[52] U.S. Cl. ............................ 395/650; 364/DIG. 1; 364/281.7; 364/228.9
[58] Field of Search ................... 364/DIG. 1; 395/650

[56] References Cited

U.S. PATENT DOCUMENTS

| | | | |
|---|---|---|---|
| 4,631,674 | 12/1986 | Blandy | 364/DIG. 1 |
| 4,636,942 | 1/1987 | Chen et al. | 364/DIG. 1 |
| 4,782,441 | 11/1988 | Inagami et al. | 364/DIG. 1 |
| 4,825,358 | 4/1989 | Letwin | 364/DIG. 1 |

OTHER PUBLICATIONS

"Microtasking on IBM Multiprocessors", IBM J. Res. Develop. vol. 30, No. 6, Nov. 1986, pp. 574-582.
"User's Manual 8090-3-765-10(E) of HITAC VOS3 Optimizing Fortran 77 Ofort77 E2, Hap Fortran 77".

Primary Examiner—Thomas M. Heckler
Attorney, Agent, or Firm—Antonelli, Terry, Stout & Kraus

[57] ABSTRACT

In a processor system for executing a plurality of tasks, which respectively control execution of one or more of a plurality of processes, a method of restarting execution of a first process which is under control of a specific task being executed, after the first process is stopped to wait for occurrence of an event associated with at least one second process different from the first process, includes the steps of (a) detecting whether or not the event associated with the second process has occurred; (b) restarting the execution of the first process when it is detected that the event has occurred; (c) determining whether or not there is an execution waiting process when the event has not yet occurred; (d) executing an executing waiting process when there is any; and (e) repeating the steps (a) to (d) after execution of an execution waiting process when there is any or after the step (c) when there is not such an execution waiting process.

37 Claims, 19 Drawing Sheets

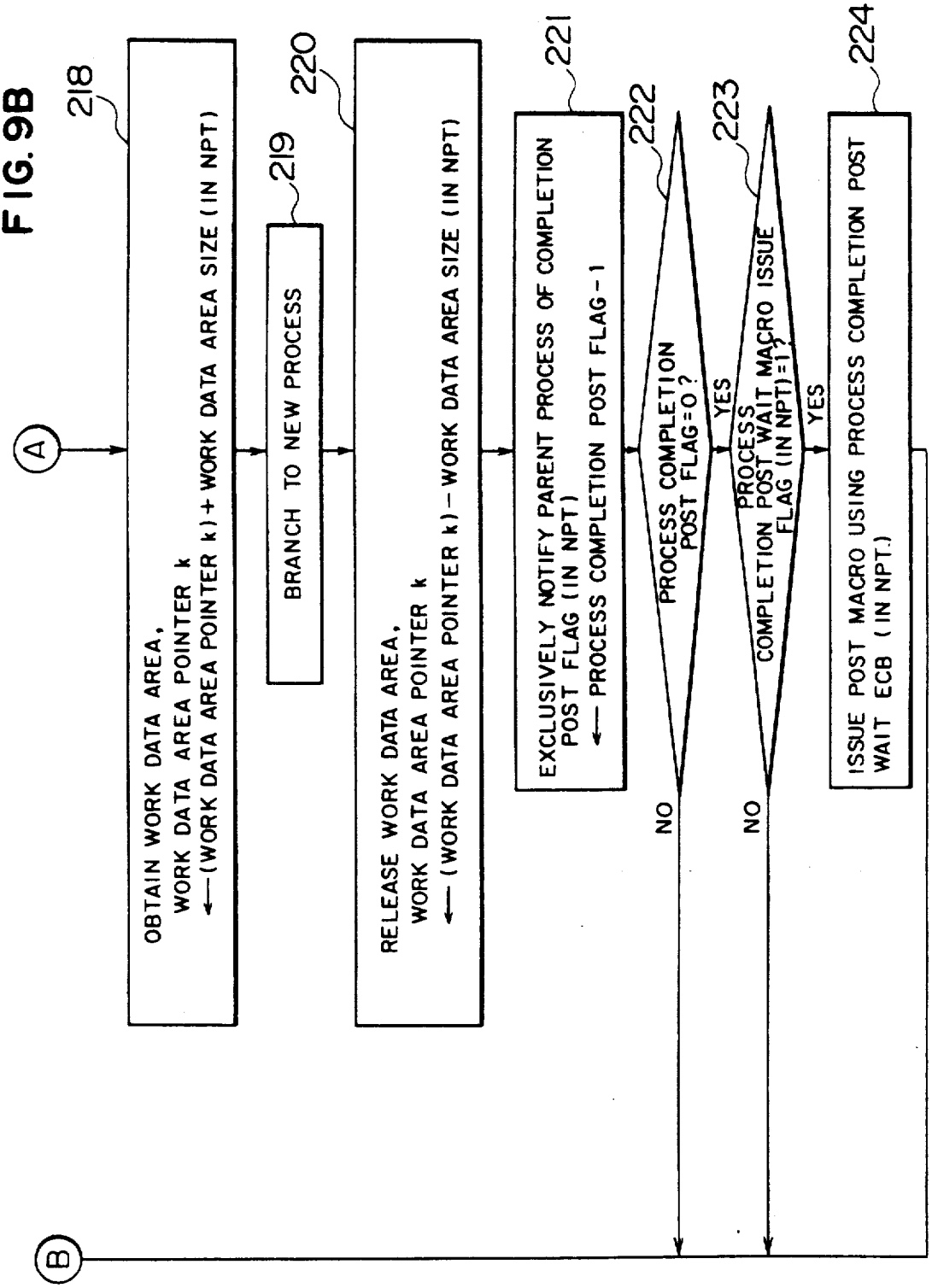

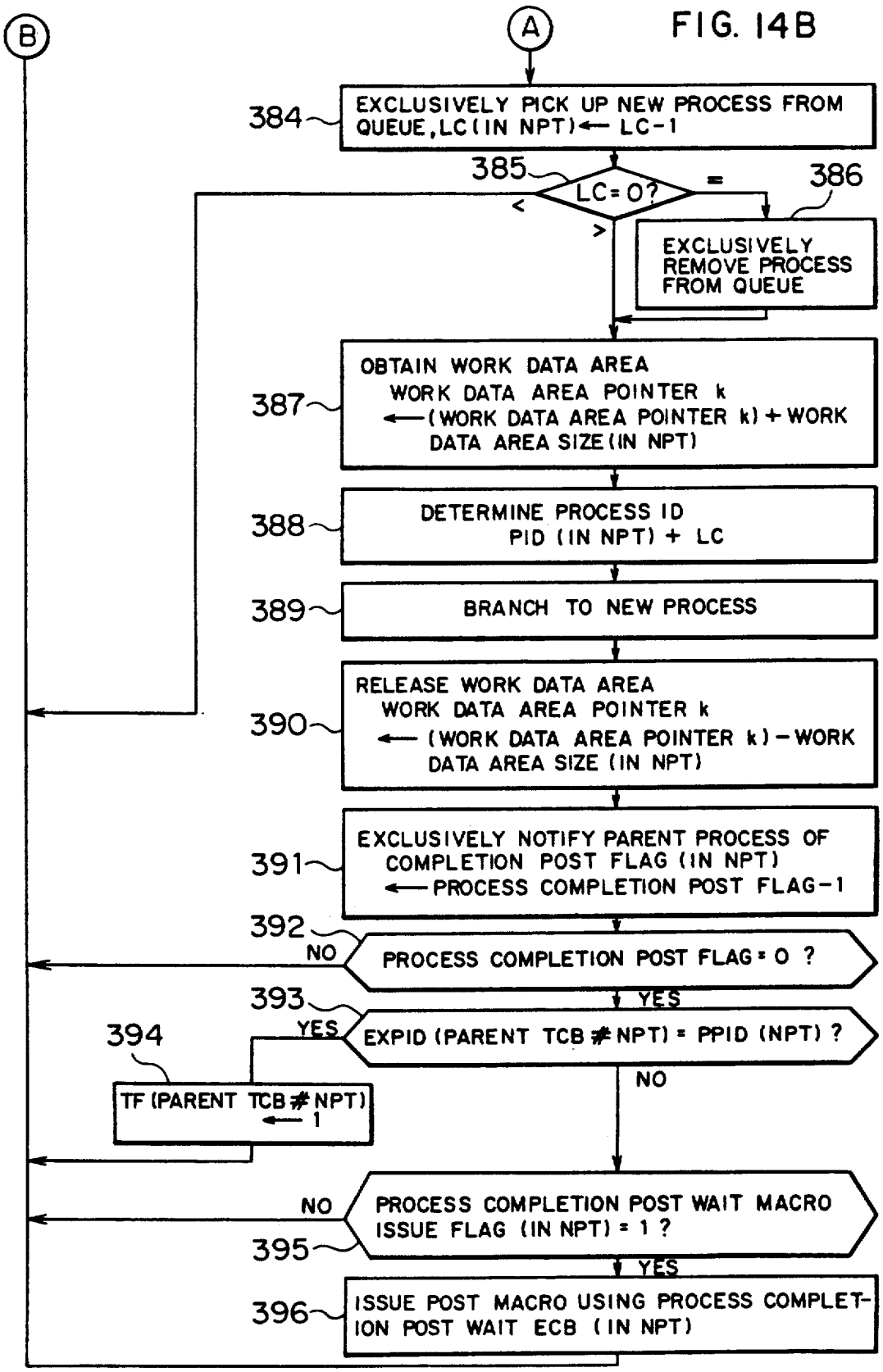

PROCESSOR SYSTEM FOR EXECUTING PROCESSES IN PARALLEL UNDER MULTITASK, CONTROL METHOD OF WAITING FOR EVENT OF PROCESS

BACKGROUND OF THE INVENTION

The present invention relates to a tightly coupled multi-processor system, and more particularly to a system for distributing a plurality of processes which are dynamically generated from a program, into a plurality of processors for efficiently executing the program under a multi-job environment.

As one approach to reducing an execution time of a program, there is known a method of dividing the program into a plurality of processes and executing them in parallel by a plurality of processors.

The following method is generally used for dividing a program into processes and executing them in parallel. Namely, a sequentially executed part of the program is executed as one process. When the processing reached a parallel executable part of the program, a plurality of child processes are generated from the part for parallel execution. After the execution of all the child processes have been completed, the next sequentially executed part is executed. A parallel executable part of the generated child process may be further divided into grandchild processes. In this case, nesting of parallel processing is allowed.

For reducing the execution time of the paralleled program, it is necessary to efficiently distribute the generated processes to multi-processors. To this end, there are known a system in which the child processes which are dynamically generated as the program is executed are registered in a queue. In such a system, a processor having no job checks the queue, and if any child process is registered in the queue, it is fetched to be executed.

Conventional distribution and communication of processes via an operating system cannot realize a high speed operation of a paralleled program. In order to distribute the processes at high speed, there has been proposed a method wherein there is performed in a problem mode the registration of a child process into a queue, the check of the queue, and the fetch of the child process.

Furthermore, in order to communicate between the processes at high speed, there is known an active wait method wherein occurrence of an event is waited in a spin loop while referring to a change in flag is checked in the problem mode. (refer to "Active Wait", U.S. Pat. No. 4,631,674).

An event to be waited in the spin loop includes such as a generation of a child process, and completion of all generated child processes (refer to "Microtasking on IBM Multiprocessors", IBM J. RES. DEVELOP. Vol. 30, No. 6, November, 1986).

A conventional technique will be illustratively described with reference to FIG. 15. At step 1001, a parent process is temporarily interrupted to wait for completion of all child processes. At step 1002 it is checked whether or not there is any new child process. If there is any new child process, it is executed at step 1003. Whereas, if not, it is checked at step 1004 whether or not all child processes have been executed. If all the child processes have been completely executed, the parent process is restarted at step 1005. Whereas, if not, the step 1004 is again executed such that the spin loop continues until all the child processes are completed.

The above-described conventional technique poses no problem if there is no nesting of parallel processes. However, when nesting of the parallel processes is allowed, there arises a problem of inefficient use of processor resources in the following case. Specifically, when a processor 0 executing a parent process has proceeded to the spin loop waiting for completion of child processes, even if a processor 1 thereafter generates a new grandchild process and registers it in a process queue, the processor 0 cannot execute the grandchild process. In this case, although the grandchild process is executed later by the processor 1 and the program is ordinarily ended, there is still the problem that the processor 0 is not efficiently used and the processing time increases.

Furthermore, with the above-described conventional technique, CPU resources are occupied by a single job in the spin loop. In this case, if a paralleled program is executed under a single job environment, there is no problem. However, if it is executed under a multi-job environment, there arises a problem of a low throughput of the system. A paralleled program debugged under a multi-job environment may be executed frequently under a single job environment. It is therefore necessary to solve this problem while making a load module usable in both the single and multi-job environments.

In order to achieve a multi-job environment, a multitasking method is conventionally used. In this method, an OS gives one or more tasks to each job. Processes constituting the job corresponding to a task are executed under control of the task. The OS causes a processor to execute tasks given to each job in a time sharing manner. The OS determines assignment of a processor using right to each task while considering the use factors of CPU resources and input/output resources in each task. Therefore, in the case where a task 1 executing a child process loses the processor using right, a task 0 having the processor using right cannot complete the program because the parent process waits in vain for the execution end of the child process at the spin loop. This is called a deadlock state. To solve this, it is necessary for the OS to detect the deadlock state and give the task 1 the processor using right.

SUMMARY OF THE INVENTION

The present invention aims at solving the above-described problems.

It is an object of the present invention to provide a process distribution method capable of executing the distribution and synchronization of processes in a user program at high speed without the help of an operating system.

In order to achieve the object of the present invention, in a processor system for executing a plurality of tasks, which respectively control execution of one or more of a plurality of processes, a method of restarting execution of a first process which is under control of a specific task being executed after said first process is stopped to wait for occurrence of an event associated with at least one second process different from said first process, comprising the steps of:

(a) detecting whether or not said event associated with said second process has occurred;

(b) restarting the execution of said first process when it is detected that said event has occurred;

(c) determining whether or not there is an execution waiting process when said event has not yet occurred;

(d) executing an executing waiting process when there is an execution waiting process; and (e) repeating said steps (a) to (d) after completion of the execution of said execution waiting process when there is an execution waiting process or after said step (c) when there is not any execution waiting process.

As described above, according to the present invention, processor resources can be used efficiently, the system throughput will not be lowered even in a multi-job environment. In addition inter-process communication can be realized while retaining high speed performance of the spin loop scheme. Furthermore, a deadlock state generated in a multi-job environment can be detected and removed.

BRIEF DESCRIPTION OF THE DRAWINGS

FIGS. 9A and 9B illustrate how the run time routine ¥WAIT for parallel processing of this embodiment is executed;

FIGS. 14A and 14B illustrate how the run time routine ¥WAIT for parallel processing of this embodiment is executed;

DESCRIPTION OF THE PREFERRED EMBODIMENTS

The present invention will be described below.

Figure 16:
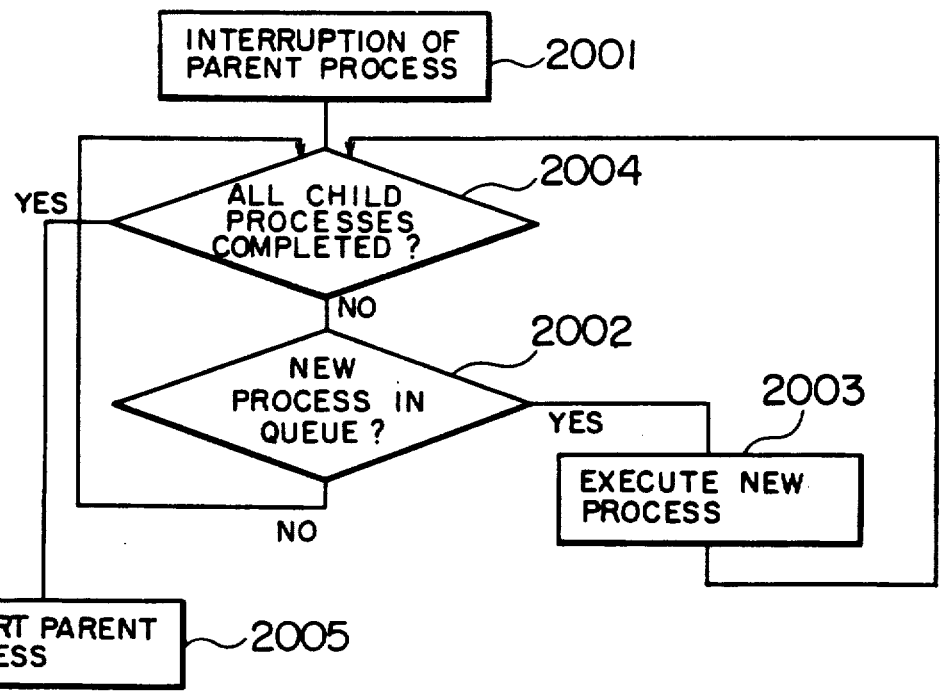
FIG. 16 is a flow chart illustrating the characteristic feature of this invention.

First, the features of the present invention will be described with reference to FIG. 16.

In the present invention, there is provided with a parallel process run time routine ¥WAIT for waiting in a spin loop for an event of completion of all child processes or an event of registration of a new process in a process queue. A parent process waiting for completion of all the child processes is temporarily interrupted at step 2001, and step 2004 is executed to check whether or not all the child processes have been completed. If all the child processes have been completed, the parent process is again executed at step 2005. If all the child processes are not completed, step 2002 is executed to check whether or not there are different processes. If there is any new process, it is executed at step 2003 and thereafter step 2004 is again executed. If there is no process, step 2004 is again executed to perform the spin loop until the event of completion of all the child processes or a new process is generated and registered.

The present invention further provides a parallel process run time routine ¥PRCS for waiting in the spin loop for registration of a process in a process queue. The object module is generated by a compiler such that at the stage waiting for completion of all child processes generated in a process object, the run time routine ¥WAIT is called, and at the start of an object to be executed by a task having no job, the run time routine YPRCS is called.

For the spin loop waiting for two events in the run time routine ¥WAIT, there are provided a flag 1 indicating completion of all the child processes, and a flag 2 indicating registration of a process in the process queue. A check of the flag 1 indicates that a child process not still executed is present, then flag 2 is checked. When the checking result of the flag 2 indicates that there is no registered process, the flag 1 is again checked.. Another flag 3 may be provided which is set when the flag 1 is set or when the flag 2 is set. Thus, the contents of the flags 1 and 2 can be represented as the flag 3. In the above manner, occurrence of an event can be detected.

The present invention further provides a limiting time period on the spin loop in the run time routines ¥WAIT and ¥PRCS. If a waited event does not occur during the limiting time period while the spin loop is executed, the spin loop is terminated, and the processor using right of the task executing a process is released until the waited event occurs. An upper limit of the number of flag-referring times may be provided in stead of the spin loop limiting time period. In this case, when the waited event does not occur though the flags are referred to a predetermined number of times, the spin loop is ended. The spin loop in which the upper limit of the number of flag-referring times is provided can be realized by a single hardware instruction. With such an instruction, the U.S. patent application Ser. No. 647,121 entitled "INFORMATION PROCESSING SYSTEM" by Kasuyoshi Kitai et al., for which priority is claimed based on a Japanese patent application (JP-A-02-013207, Jan. 23, 1990), has been filed on Jan. 18, 1991, as a related application. This application is incorporated herein by reference.

As an OS macro for releasing the processor using right by the task itself, there is the WAIT macro in HITAC VOS3/ES. When a notice is given to the communication area designated by an operand of the WAIT macro, the OS causes the task to again obtain the processor using right by itself. The above limiting time period is determined by the run time routine when it is executed, in accordance with the estimated execution time of each process by the compiler, the system running state in which a job is executed under a multi-job environment, the job class designated by a user, and the like.

Next, the embodiments of this invention will be described with reference to the accompanying drawings.

First Embodiment

Figure 1:
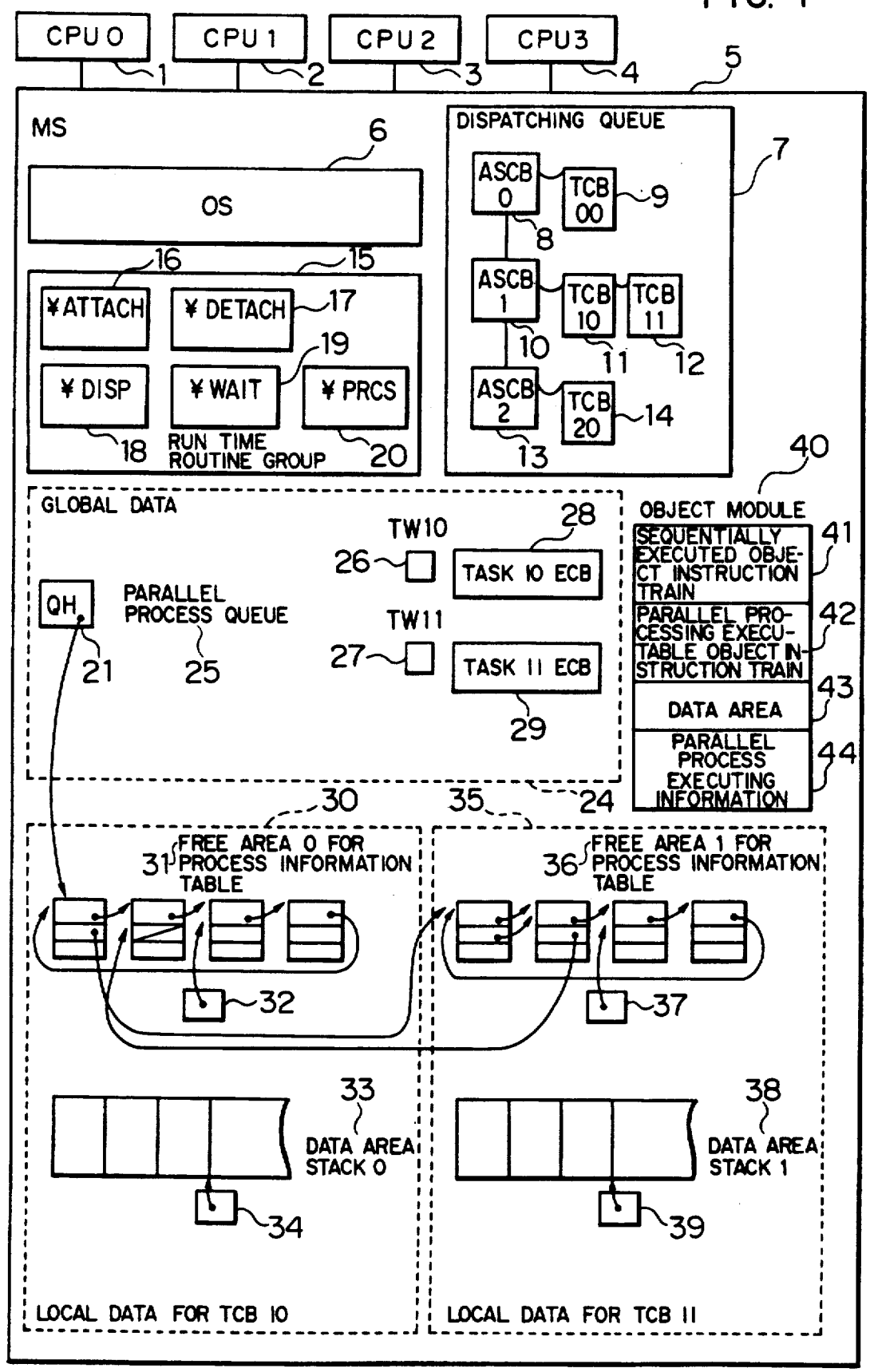
FIG. 1 is a schematic diagram showing the outline of the process distribution method according to a first embodiment of this invention.

FIG. 1 is a schematic diagram showing an entire arrangement of a process or system according to a first embodiment of this invention. In FIG. 1, CPUs 1 to 4 constituting a multi-processor system are connected to a main storage 5.

A complier compiles a source program into an object module 40 which includes an object instruction train 41 of a sequentially executed part, an object instruction train 42 of a parallel processing executable part, a data area 43, and parallel process executing information 44. A main process of the program is the sequentially executed part and generates sub-processes for the parallel executable part. In the first embodiment of this invention, nesting of parallel processing is allowed, and each sub-process can generate secondary sub-processes for a parallel executable part of the sub-process.

When a request for processing a user job is received, an OS 6 generates or provides a user space (ASCB 1) 10 and a main task (TCB 10) 11 which is executed in the user space 10. Each task controls execution of a plurality of processes constituting a user job. In practice, a run time routine which is controlled by the task controls selection of a process to be executed, start, synchronization and end of the process, and the like. There is in the following description a case when a TCB for controlling a task is called task.

The OS 6 causes the main task 11 to execute a prolog process and an epilog process as start and end portions of the program, and the sequentially executed object instruction train as the main process In the prolog process, a run time routine ¥ATTACH 16 is called to determine the number of sub-tasks to be generated while considering the system state based on the number of sub-tasks designated by a user in a PARAM operand of an EXEC statement of a job control language JCL and to generate, sub-tasks (TCB 11, 12, ...).

In the first embodiment of this invention, it is assumed that only the sub-task (TCB 11) 12 is generated. The sub-task 12 calls a run time routine ¥PRCS 20. This routine waits that a process information table is registered in a parallel process queue 25, picks up information of a sub-process generated based on the registered table, reserves for each task a work data area 33, 38 necessary for the execution of the sub-process in a local data area 30, 35, the area 33, 38 being managed in a stack manner, executes the sub-process, and thereafter releases the work data area 33, 38. The routine ¥PRCS 20 releases CPU using right not to lower the throughput of the multiprocessor system when the process information table is not registered in the queue 25 after waiting a predetermined time period.

When the execution of the main process reaches just in front of the parallel executable part, a run time routine ¥DISP 18 is called. This routine 18 reserves for each task an area from a process information table free area 30, 35, generates the parallel process information table which collectively indicates the information necessary for the execution of the parallel executable part, and registers the same in the queue 25. A plurality of parallel sub-processes can be generated from a single process information table. In this case, a main process or sub-process which generates the process information table is called a parent process, and sub-processes which are generated based on the process information table are called child processes. At the same time, the routine DISP 18 refers to a task wait flag (TW 10, TW 11) 26, 27 and issues a POST macro to an ECB (task 10 ECB, task 11 ECB) 28, 29 provided for each task to inform the generation of processes to be executed when there is a task which has issued a WAIT macro.

The free area 31, 36 which is used for generating the process information table is chained t the local data areas 30, 35 provided for each task. A free area pointer 32, 37 provided for each task indicates to what areas the free area 31, 36 has been used. The queue 25 is constituted to chain the table area 31, 36 containing the information of executable processes, from a parallel process queue start address QH 21 as a starting point in a global data area 24.

After the execution of the routine ¥DISP 18, the main process calls a run time routine ¥WAIT 19. This routine waits for the execution end of all child processes or the registration of a new process information table in the queue 25. When the new process information table is registered, the routine ¥WAIT 19 picks up the information of the sub-process to be executed from the registered table, reserves in correspondence with each task the area 33, 38, which is managed in a stack manner, necessary for the execution of the sub-process in the area 30, 35, executes the sub-process, and thereafter releases the area 33, 38. Alternatively, when the execution of the sub-process is not still ended or the new process information table is not registered, after a predetermined time period is elapsed or after a spin loop is executed a predetermined number of times, this routine issues the WAIT macro and releases the CPU using right by itself not to lower the throughput of the system.

An example will be described below in the first and second embodiments wherein the spin loop is executed until the predetermined time period is elapsed. However, it is apparent that the same effect can be obtained even in a case where the spin loop is executed until the execution reaches a predetermined upper limit on the number of times.

After the completion of the routine ¥WAIT 19, the main process restarts the execution of the sequentially executed object. The epilog process to be executed at the end portion of the main process calls a run time routine ¥DETACH 17 for deleting the generated sub-task (TCB 11) 12 and then the program is ended.

The data area 33, 38 is for reserving a working data area necessary for executing parallel processes and its stack pointer 34, 39 is for indicating the data area.

When this job is executed under a multi-job environment, though there are present other user spaces (ASCB 0, ASCB 2) 8, 13 and tasks (TCB 00, TCB 20) 9, 14 to be executed in their user spaces, the scheduling process for determining which task is to be executed is carried out by the OS 6 using a known scheduling process control technique.

Figure 2:
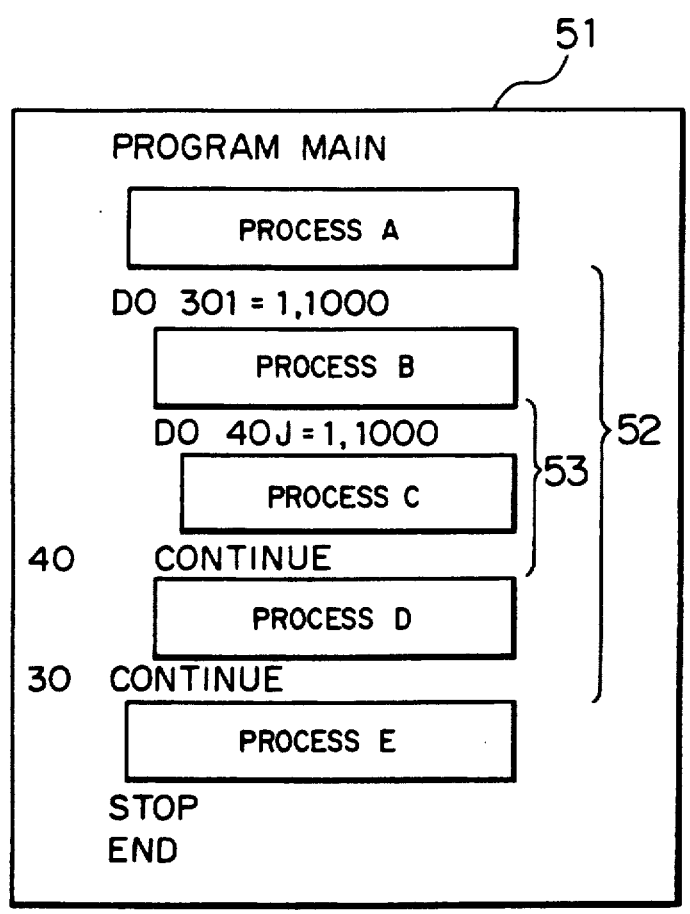
FIG. 2 shows an example of a source program of the first embodiment.
Figure 3:
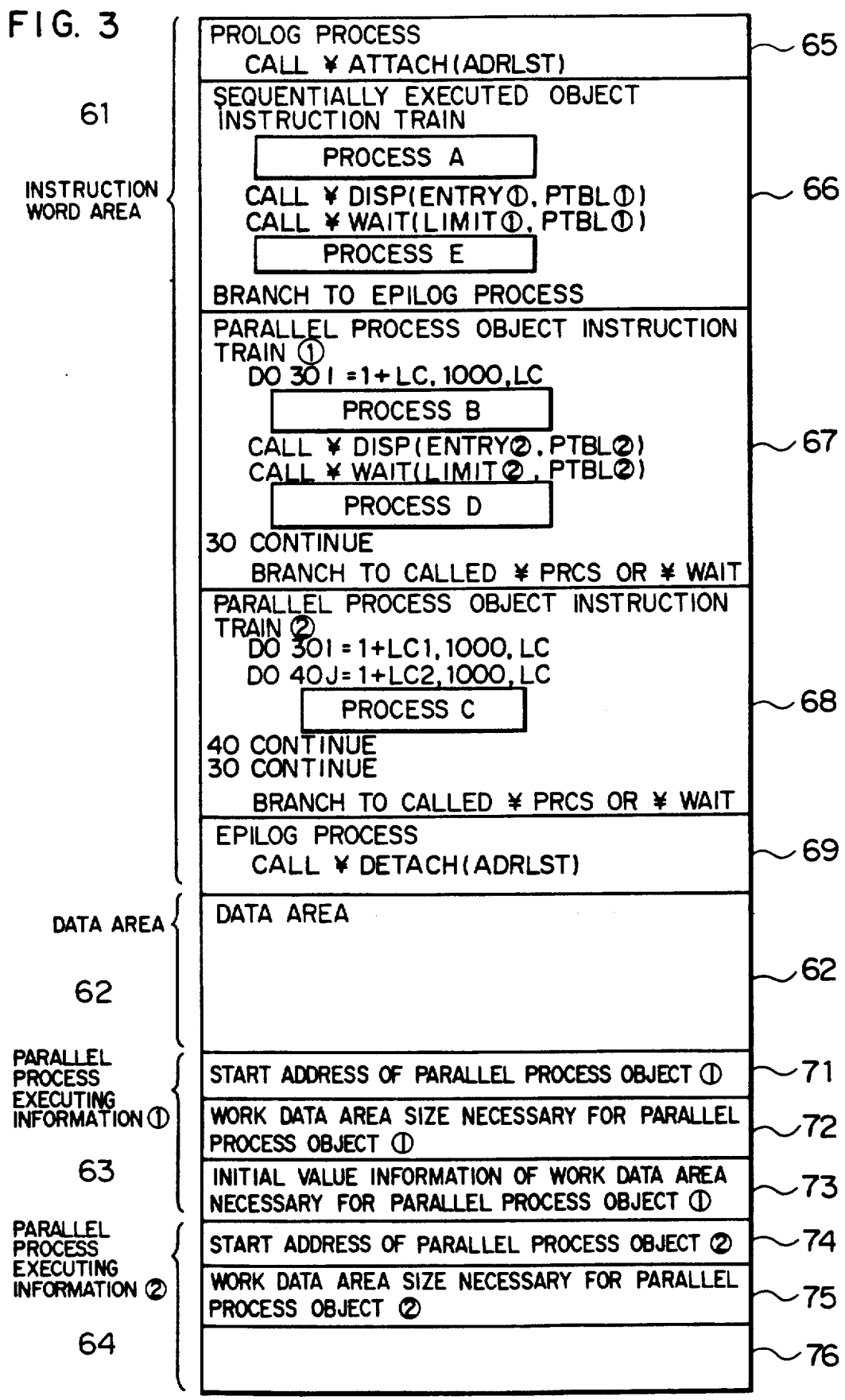
FIG. 3 shows the structure of an object module of the first embodiment.

An example of a FORTRAN source program including a parallel executable part is shown in FIG. 2. FIG. 3 shows an object module generated from the source program shown in FIG. 2 in accordance with the present invention, the object module being described in a manner like FORTRAN, FIG. 4 conceptually shows the executing sequence of processes generated from the object module shown in FIG. 3.

In the source program 51 shown in FIG. 2, processes A and E are the sequentially executed part, processes B and D in a loop 52 of DO 30 are executable in parallel with respect to subscript I, and a process C in a loop 53 of DO 53 is executable in parallel with respect to subscripts I and J.

The rough structure of the object module shown in FIG. 3 is substantially the same as that for a conventional program sequentially executed, except for parallel process object instruction trains 67 and 68 and parallel process executing information 63, 64. Refer to, for example, the structure of an object module described at page 476 in "User's Manual 8090-3-765-30 of HITAC VOS3 Optimized FORTRAN 77 OFORT77 E2, HAP FORTRAN 77". The object instruction train for executing the processes B and D in the source program 51 is stored in a field of the parallel process object instruction train ① 67, and the object instruction train for executing the process C is stored in a field of the parallel process object instruction train ② 68. Information, which is generated by a compiler, necessary for the execution of the parallel process object ① 67 is stored in a field of the parallel process executing information ① 63, and information necessary for the execution of the parallel process object ② 68 is stored in a field of the parallel process executing information ② 64.

Figure 4:
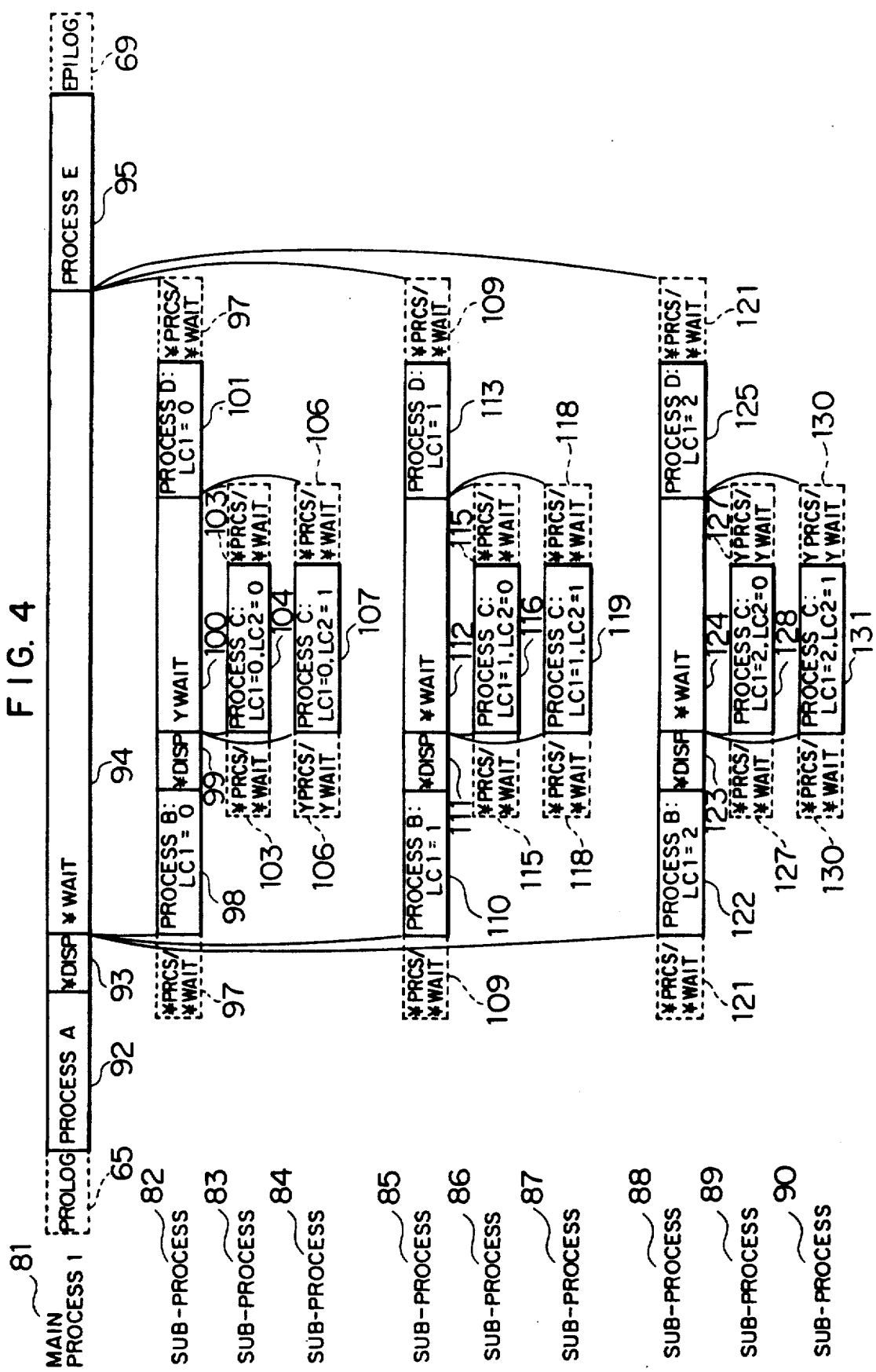
FIG. 4 conceptually illustrates the execution sequence of processes according to the first embodiment.

Referring now to FIGS. 3 and 4, there will be described correspondence between the contents of the object module and the processes, and the conceptual executing sequence of the processes.

A prolog process 65 is executed by the main task (TCB 10) 11. The prolog process 65 is the same as a conventional program sequentially executed except that the run time routine ¥ATTACH 16 is called. The detail of the execution of the routine ¥ATTACH 16 will be given later.

After the prolog process 65, the main task (TCB 10) 11 executes as the main process 1 81 the sequentially executed object 66. After the execution of the process A 92, the main task 11 calls the routine ¥DISP 93 for the generation of a process for DO 30 as a child process. The detail of the execution of the routine ¥DISP will be given later. An argument ENTRY ① in the routine ¥DISP 93 indicates the start address of the information ① 63, and a start address of the generated process information table is returned back to an argument PTBL ①.

The routine ¥DISP 93 traces the information obtained through the argument ENTRY ① to generate a process information table for the execution of the parallel process object ① 67. The routine ¥DISP 18 determines values to be given to loop control variables LCl and LC which have been entered in the parallel process object ① 67 by the compiler, to thereby determine the number of sub-processes to be generated. In the first embodiment of this invention, the variable LC1 is given 0, 1 and 2, and the variable LC is given 3. Thus, there are generated a sub-process 2 82, sub-processes 3 85, and sub-process 4 88. The generated sub-processes are fetched and executed by the routine ¥PRCS or ¥WAIT (97, 109, 121) which is being executed in a task.

After the execution of the routine ¥DISP 93, the main process 1 81 calls the routine ¥WAIT 94, the main process 1 81 calls the routine ¥WAIT 94 using the argument PTBL ① of the routine ¥DISP 93. In a process information table indicated by the argument PTBL ①, there are a process completion post flag (to be described later) indicating whether or not all child processes, i.e., the sub-processes 2, 3 and 4 (82, 85, 88) have been completed. The routine ¥WAIT 94 waits for the completion of all the child processes while referring to the post flag, until a predetermined time period elapses which has been determined based on consideration of the value of an argument LIMIT ① and the state of the job and the system. The value of the argument LIMIT ① is determined by the compiler based on an estimated execution time of each generated sub-process and an execution time required for the POST/WAIT macro conventionally used for synchronization between tasks. The routine ¥WAIT 94 waits for the completion of the sub-processes and also for the generation of new sub-processes, the latter case being described later.

Each of the sub-processes 2, 3, 4 82, 85 and 88 executes the parallel process object ① 67 with the different value of the variable LC1. After the execution of the process B, the routine ¥DISP (99, 111, 123) is called for the generation of a process for DO 40 as a child process. An argument ENTRY ② of the routine DISP 99, 111, 123 indicates the start address of the information ② 64, and the start address of the process information table for executing the parallel process object ② 68 is returned back to an argument PTBL ①. In this embodiment, a loop control variable LC2 entered in the parallel process object ① 68 by the compiler is given 0 and 1, and the variable LC is given 2. Thus, sub-processes 5 and 6 83, 84 are generated from the sub-process 2 82, sub-processes 7 and 8 86, 87 from the sub-process 3 85, and sub-processes 9 and 10 89, 90 from the sub-process 4 88.

After the execution of the routine ¥DISP 99, 111, 123, the sub-process 2, 3, 4 82, 85, 88 calls the routine ¥WAIT 100, 112, 124 which waits for the completion of the sub-processes 5 and 6 83, 84, sub-processes 7 and 8 86, 87, and sub-processes 9 and 10 89, 90 until the time period indicated by the argument LIMIT ② elapses, while referring to the post flag traced from the argument PTBL ②.

The sub-process 5, 6, 7, 8, 9, 10 83, 84, 86, 87, 89, 90 executes the parallel process object ② 68 with different values of the variables LC1 and LC2. After the execution of the process C, the sub-process branches to the routine ¥PRCS or ¥WAIT 103, 106, 115, 118, 127, 130 from which the sub-process itself was derived. The routine ¥PRCS or ¥WAIT 97, 109, 121 informs the parent process of the completion of the child process through the post flag, and deletes the child process.

The routing ¥WAIT 100, 112, 124 executed by the sub-process 2, 3, 4 82, 85, 88 branches to the called routine and ends its execution when it is informed of the completion of all the child processes, i.e., the sub-processes 5 and 6 83, 84, the sub-processes 7 and 8 86, 87, or the sub-processes 9 and 10 89, 90. The sub-process 2, 3, 4 82, 85, 88 then executes the process D (101, 113, 125), and after the execution of the process D, it branches to the routine ¥PRCS or ¥WAIT 97, 109, 121 by which the sub-process was derived. The routine ¥PRCS or ¥WAIT 97, 109, 121 informs the main process 1 81 as the parent process of the completion of the derived child process, and deletes the child process.

When the routine ¥WAIT 94 executed in the main process 1 81 receives a notice of the completion of all the sub-processes, i.e., sub-processes 2, 3 and 4 82, 85, 88, it branches to the called routine and ends its execution. The main process 1 81 then executes the process E 95, and branches to the epilog process 69. The execution of the epilog process 69 is the same as a sequentially executed conventional program except that it calls the routine ¥DETACH 17.

The data area 62 shown in FIG. 3 is constructed of the same data areas as a conventional program sequentially executing, such as the register save area used when a process is interrupted, the areas for variables, arrays and the parameter list area.

The parallel process executing information 63 64 stores the following information for each parallel process object.

A field of a parallel process object start address 71, 74 stores a start address of a parallel process object in the instruction word area. A field of a work data area size 72, 75 stores the size of a work area for temporary variables, variables, and arrays necessary for execution of parallel process object. A field of an initial value information 73, 76 for a parallel process object stores a base address and the like of the work area when each work area is too large to be covered by one base register.

Figure 6C:
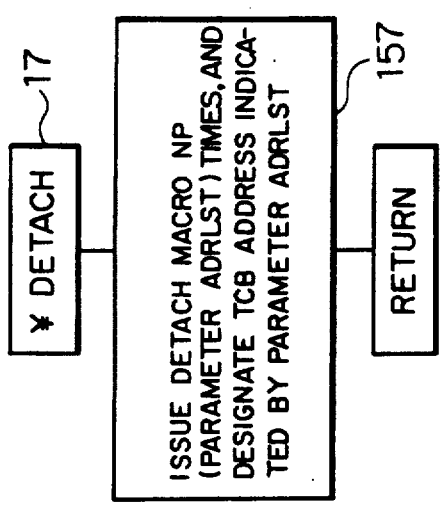
FIGS. 6A to 6C illustrate how the run time routines ¥ATTACH and ¥DETACH for parallel processing of the first embodiment are executed.
Figure 6B:
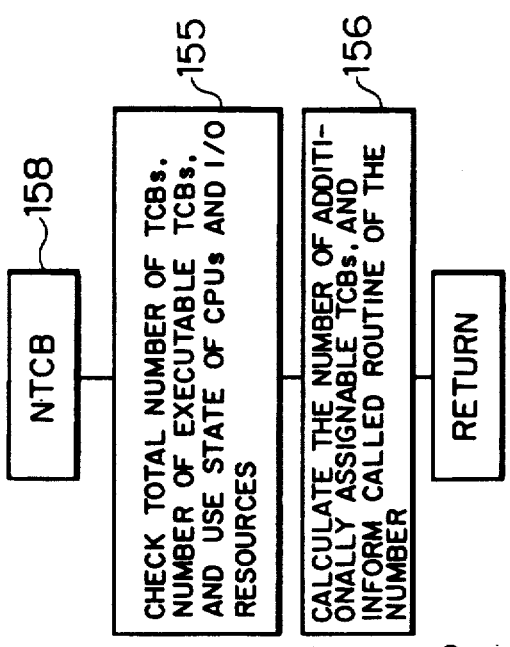
Figure 6A:
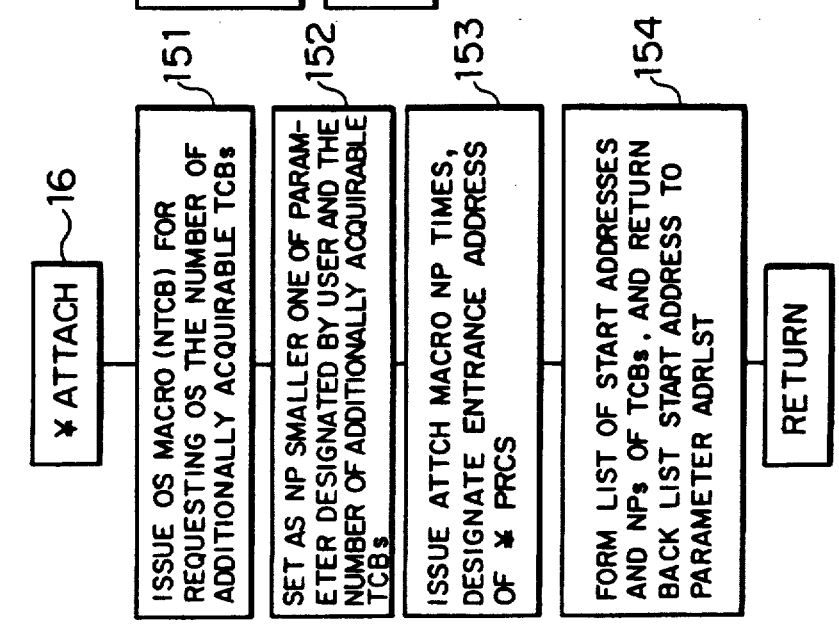

The process of the run time routines ¥ATTACH 16 and ¥DETACH 17 will be described with reference to FIGS. 6A to 6C. In the routine ¥ATTACH 16, in order to prevent the throughput of the system from being lowered by too many TCBs in the system, a macro (NTCB) is generated at step 151. This macro asks the OS the number of additionally obtainable TCBs prior to generating sub-tasks. The OS which executes the NTCB 158 checks at step 155 the number of all TCBs present in the system, the number of executable TCBs, and the using state of CPU resources and I/O resources. At step 156 the OS calculates the number of additionally assignable TCBs and gives it as an argument to the job which asked the OS. At step 152 in the routine ¥ATTACH 16, there is set as a variable NP a smaller one of the number of additionally obtainable TCBs and the number of sub-tasks requested and designated with a JCL by a user. At step 153 a know ATTACH macro is issued NP times for asking the OS the generation of sub-tasks. When the ATTACH macro is issued, an entrance address of the routine ¥PRCS 20 is designated to make the sub-tasks execute the routine ¥PRCS 20. At step 154 there is formed a list of NP start addresses of TCBs and the variable NP responded from the OS upon execution of the ATTACH macro. The start address of the list is returned back to an argument ADRLST.

At step 157, the routine ¥DETACH 17 receives the argument ADRLST returned from the routine ¥ATTACH 16, and issues a known DETACH macro NP times for asking the OS deletion of the TCBs indicated in the argument.

Figure 5:
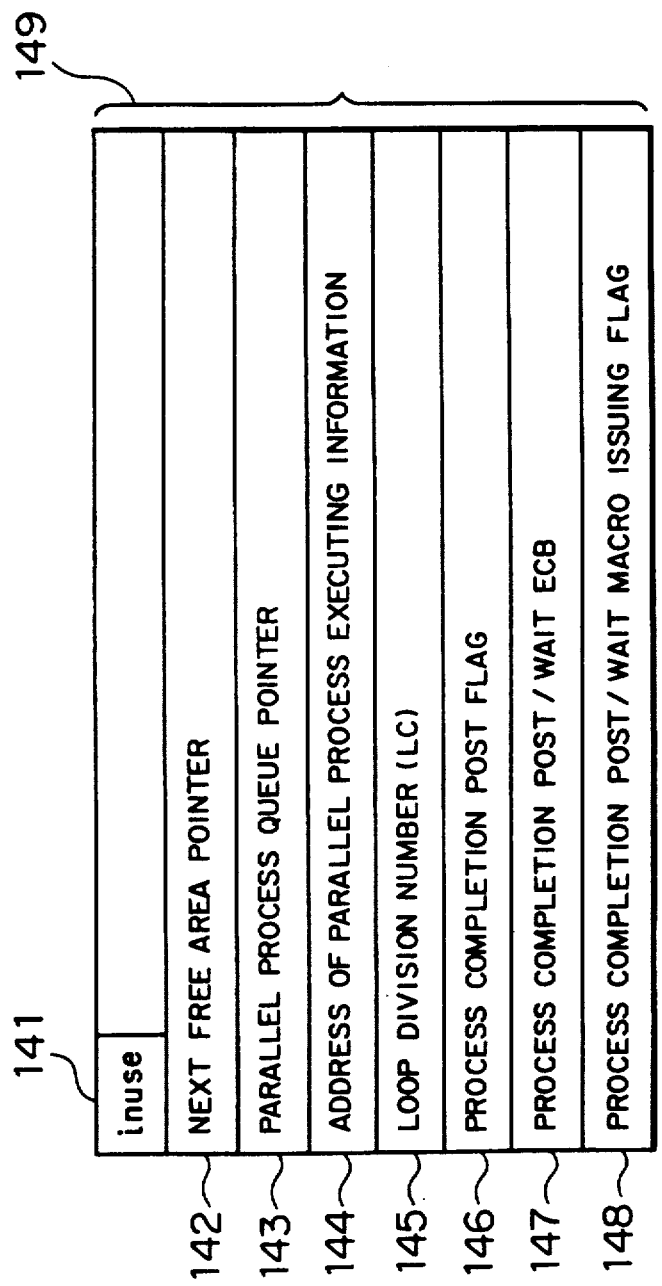
FIG. 5 shows the structure of a process information table according to the first embodiment.
Figure 7:
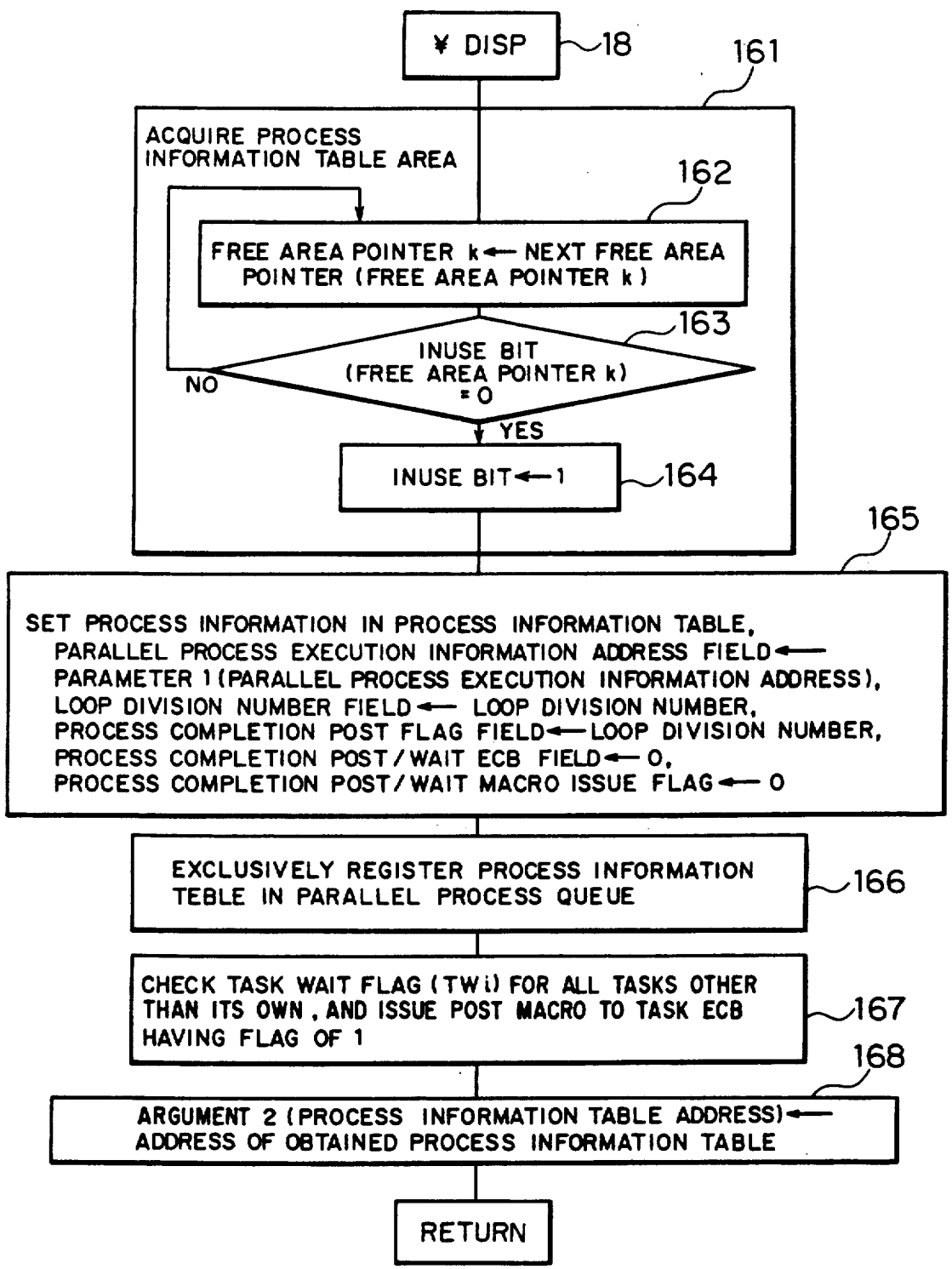
FIG. 7 illustrates how the run time routine ¥DISP for parallel processing of the first embodiment is executed.

The process of executing the routine ¥DISP 18 by a task k (TCB k) will be described with reference to FIGS. 7 and 5 showing the contents of the process information table 149.

An in-use bit 141 shown in FIG. 5 is set to "1" when the routine ¥LISP 18 generates the table 149, and reset to "0" by the routine ¥WAIT 19 when all child processes generated based on the table 149 have been ended. While this bit is set "1", an area for process information table is in use.

A next free area pointer 142 is for chaining the process information table areas 31, 36 in the local data area 30, 35 (FIG. 1) of the task k, and holds the start address of the next process information table area.

A parallel process queue pointer 143 is for chaining process information tables in the parallel process queue 25 (FIG. 1). In the pointer, "0" is set when the table 149 is the last entry in the parallel process queue, and a start address of the next process information table is set when the table 149 is not the last entry but an intermediate entry.

At step 161 shown in FIG. 7, a process information table area is reserved from the process information table free area 31, 36 for the task k. The free area pointer k 32, 37 is a pointer indicating to which areas the free area has being used. At step 162, the value of the pointer 143 within the table 149 indicated by the pointer k 32 37 is set as a new free area pointer k 32, 37, thereby reserving the address of the next process information table area. At step 163, it is checked whether or not the in-use bit 141 of the table 149 is "0". If the in-use bit is "1", step 162 is again executed because the table 149 is in use. If the in-use bit is "0" at step 163, the in-use bit 141 is set to "1" to indicate that the process information table is in use.

At step 165 the information necessary for the execution of parallel processes determined when this routine is executed is set in the obtained process information table 149. In a field for a parallel process information address 144, there is set the start address of the parallel process executing information 63, 64 inputted as the argument in order to hold the information necessary for the execution of parallel processes generated by the compiler. In a field for a loop division number LC 145, there is set the number of sub-processes to be generated based on the process information table and to be determined when this routine is executed, while considering the number of sub-tasks and sub-processes generated by the job and the load balance of processes. When sub-processes 2, 3 and 4 82, 85, 88 shown in FIG. 4 are to be generated, the number LC is set to "3". In the routines ¥PRCS 20 and ¥WAIT 19, a sub-process is picked up one at a time from the queue 25 by decrementing the loop division number LC 145 by one.

A field for the process completion post flag 146 is a communication area for noticing completion of a sub-process by decrementing the value therein by "1". The loop division value is set as an initial value.

A field for a process completion post/wait ECB (Event Control Block) 147 is also a communication area for noticing completion of a sub-process. In the routine ¥WAIT 19 executed by the task k after the routine ¥DISP 18, a WAIT macro is issued when all sub-processes have not been ended or a new sub-process is not generated after a predetermined time period is elapsed. In this case, the post/wait ECB 147 notices completion of the last executed sub-process. An initial value is set to "0". A process completion post/wait macro issue flag 148 indicates whether or not the last executed sub-process is to issue a POST macro. An initial value is set to "0".

At step 166, the process information table set with the above-described values is exclusively registered in the queue 25. This exclusive control is performed because of a possibility that a plurality of tasks update data at the same time. For example, with the nesting of parallel processing as in the present embodiment, the routine ¥DISP 18 may run at the same time for both the sub-processes 2 82 and 3 85. An exclusive registration of an entry into the queue may be realized by using a main storage exclusive access command of a known exclusive control technique. As a main storage exclusive access instruction, there is for example a CS (Compare and Swap) command of HITAC M-series.

In the routines ¥PRCS 20 and ¥WAIT 19, when the process information table is not registered in the queue 25 after the predetermined time period is elapsed, the task wait flag TWi 26, 27 provided for each task is set to "1", and a WAIT macro is issued to make the task enter in a wait state so that CPU resources can be efficiently used. At step 167, the task i ECB 28, 29 is designated as a communication area for the task to which the WAIT macro was issued, and a POST macro is then issued to the task to release the wait state and inform the task of the registration of a new process information table 149.

At step 168, the start address of the obtained process information table is returned back to the second argument PTBL to thereafter end the routine ¥DISP 18.

Next, the process of executing the routine ¥PRCS 20 by a task k (TCB k) will be described with reference to FIGS. 8A and 8B.

At step 181 it is checked whether or not the start pointer QH 21 of the queue 25 is "0". When not "0", steps 183 to 192 are executed. That the pointer QH 21 is not "0" means that any process information table is present in the queue 25.

At step 183 a sub-process generated based on the process information table indicated by the pointer QH 21 is exclusively picked up. Specifically, the loop division number LC 145 within the table 149 is exclusively decremented by "1". This exclusive control is required because a plurality of tasks may concurrently execute the routines ¥PRCS 20 and ¥WAIT 19 and the number LC may be decremented. When the sub-process is executed, the decremented value of LC is used as LC1 or LC2 shown in FIG. 4.

At step 184, it is checked whether or not the picked up sub-process is the starting one among all sub-processes. If the decremented value of LC is negative, it means that all the sub-processes have been picked up because of update of other tasks and step 181, therefore, is again executed. If the decremented value of LC is positive, it means that a sub-process has been picked up so that step 186 is executed. If the decremented value of LC is "0", it means that the last sub-process generated based on the table 149 has been picked up so that the table 149 is exclusively removed from the queue 25 at step 185, and thereafter step 186 is executed. A process of removing an entry from the queue can be realized by using the above-described CS command of a known exclusive control technique.

At step 186, the required work data area size 72, 75 of the executing information 63, 64 indicated by the table 149 is read, and a work data area necessary for the execution of sub-processes is reserved within the local data area 33, 38 for the task k. The work data area is an additional area necessary for the execution of parallel processes, and stores loop control variables and temporary variables for sub-processes (2 to 10) 82 to 90 because of lack of registers. A size of the work data area is determined by adding the work data area pointer k 43, 39 (FIG. 1) to the work data area size 72, 75. The reservation/release of the work data area 33, 38 is carried out in a stack manner.

At step 187 the work data area start address is set in a register which is used as a work data area base register in the object module. Also at step 187 there is read out the parallel process object start address 71, 74 of the executing information 63, 64 indicated by the table 149, and the routine branches to the read address to execute the sub-process.

After executing the sub-process, the work data area 33, 38 reserved at step 186 is released at step 188. This release is carried out by subtracting the work data areas size 72, 75 from the pointer k 34, 39.

At steps 189 to 192, completion of the child process is noticed to the parent process. This completion notice of the child process is carried out at step 188 by exclusively decrementing by "1" the post flag 146 in the table 149. The post flag 146 is set with the loop division number LC as its initial value. When this value becomes "0", it means that all child processes have been completed. It is checked at step 190 whether or not the decremented value of the flag 146 is "0", i.e., whether or not the child process is the last completed one among all the child processes. When the value is "0", it means that the child process is the last completed child process. Then, at step 191 it is further checked whether or not the flag 148 is "1", i.e., whether or not the parent process has issued a WAIT macro. When the flag is "1", it means that a WAIT macro was issued. Then, at step 192 a POST macro is issued to the parent process by using as a communication area the ECB 147, and step 181 is again executed. When the flag 146 is determined to be not "0" at step 190, or when the flag 148 is determined to be not "1" at step 191, then step 181 is again executed because it is not necessary to issue the POST macro to the parent process.

When the address QH 21 is "0" at step 181, it is checked at step 182 whether or not a predetermined time period has elapsed. If not, step 181 is again executed and steps 181 and 182 are repeated until the address QH 21 becomes other than "0" as a table 149 was newly registered in the queue 25, or until the predetermined time period has elapsed. This time period is predetermined by the routine ¥PRCS 2 while considering the system running stage such as the multi-job environment, a job class designated by a user, and the like.

When the time period has elapsed at step 182, step 193 is executed to release the CPU using right in order not to lower the system throughput.

At step 193, the task wait flag TWk 26, 27 provided for each task is set to "1" indicating that the task k is issuing the WAIT macro, and the WAIT macro is issued using as a communication area an ECB of the task k 28, 29 provided for each task.

When a new table 149 was generated by the routine ¥DISP 18 under execution by another task, a notice of such generation is given to the task k ECB 28, 29. The task k again acquires the CPU using right and restarts the execution of the routine ¥PRCS 20 at step 194. At step 194, the task wait flag TWk 26, 27 is set to "0" indicating that the WAIT macro is not being issued, a value "0" is set in the task k ECB 28, 29 as the communication area for preparing for the re-use, and step 181 is again executed.

Figure 9A:
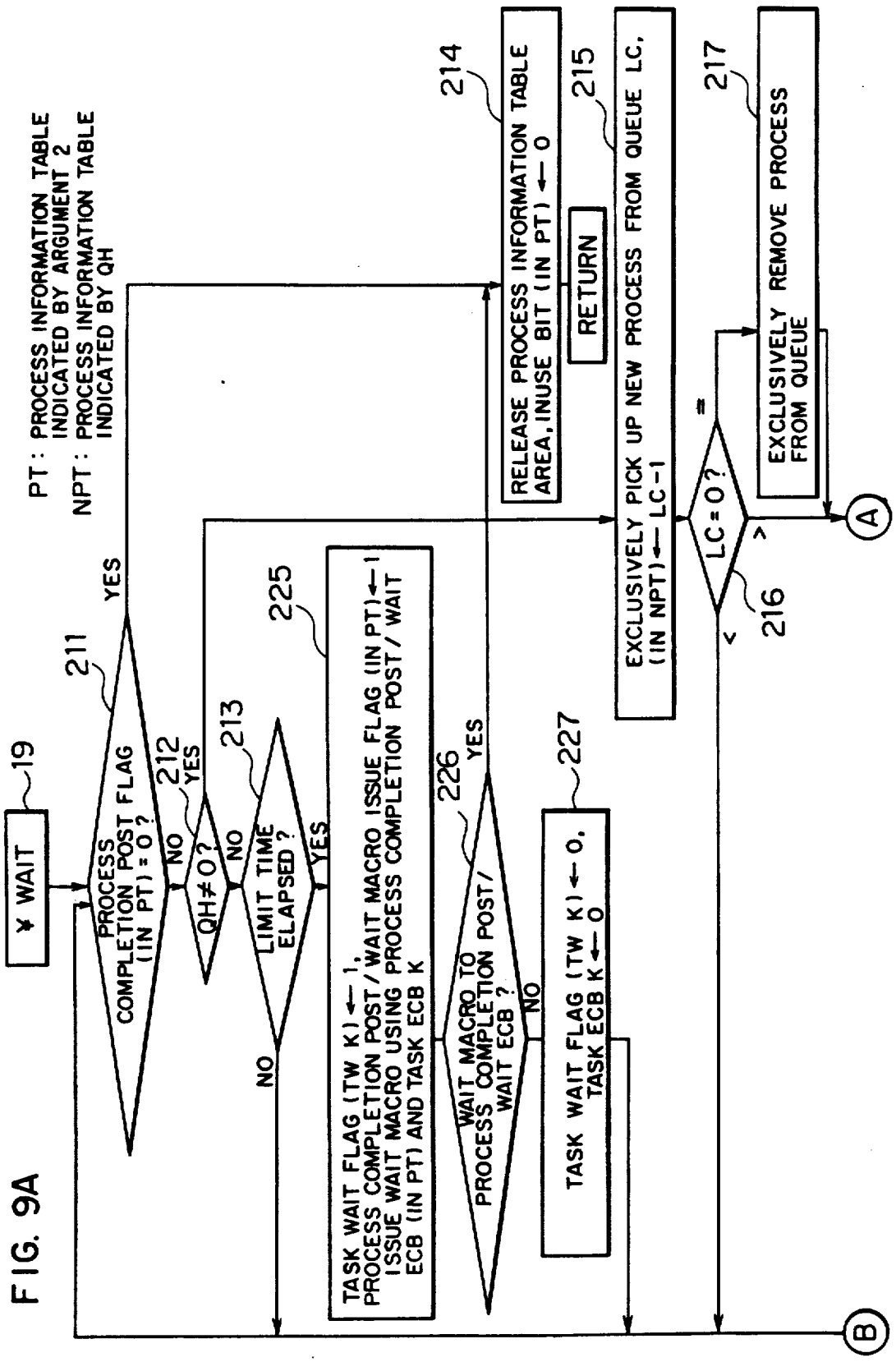

Next, the process of executing the routine ¥WAIT 19 in a task k (TCB k) will be described with reference to FIGS. 9A and 9B.

It is checked at step 211 whether or not the flag 146 of the table 149 is "0", i.e., whether or not all generated child processes have been ended. If completed, the in use bit 141 of the table 149 is set to "0" to release the process information table area and the execution of the routine ¥WAIT 19 is completed for the case where the task k executes the routine ¥DISP 18 later. If there is still present a child process not executed at step 211, it is checked at step 212 whether or not the start address QH 21 is "0", i.e., whether or not the table 149 is present in the queue 25. If present, a new process is executed at steps 215 to 224. The contents of steps 215 to 224 are the same as steps 183 to 192 of the routine ¥PRCS 20 shown in FIGS. 8A and 8B.

If the table 149 is not present in the queue 25 at step 212, then it is checked at step 213 whether or not a predetermined time period has elapsed. If not, step 211 is again executed and steps 211 to 213 are repeated until all child processes have been ended to set the flag 146 to be "0", until the address QH 21 becomes other than "0" as a new table 149 was registered in the queue 25, or until the predetermined time period has elapsed. This time period is predetermined by the routine ¥WAIT 19 as a parent process while considering the system running state such as the multi-job environment, a job class designated by a user, the first argument LIMIT which is the time period determined by the compiler basing upon the estimated execution time of parallel processes, and the like.

When the time period has elapsed at step 213, step 225 is executed to release the CPU using right in order not to lower the system throughput.

At step 225, the task wait flag TWk 26, 27 provided for each task is set to be "1" indicating that the task k is issuing a WAIT macro, and the flag 148 is set to be "1" indicating that the parent process is issuing the WAIT macro. The WAIT macro is issued using as a communication area both the task k ECB 28, 29 and the ECB 147 of the table 149, so as to receive a notice in either case where a new sub-process is generated or where all child processes are completed.

When the new sub-process was generated or all the child processes have been ended, such an effect is noticed to the task k ECB 28, 29 or to the ECB 147 so that the task k again acquires the CPU using right to execute the routine ¥WAIT 19 at step 226.

It is checked at step 226 whether or not the notice was given to the ECB 147. If given to the process completion post/wait ECB, step 214 is executed to released the process information table area. On the their hand, if given to the task k ECG 28, 29, step 227 is executed to set "0" in the task wait flag TWk 26, 27 and the task k ECB 28, 29, and thereafter step 211 is again executed.

Second Embodiment

This embodiment will be described with reference to FIGS. 10 to 14 where in a single flag represents occurrences of an event of completion of a child process and an event of generation of a sub-process.

Figure 10:
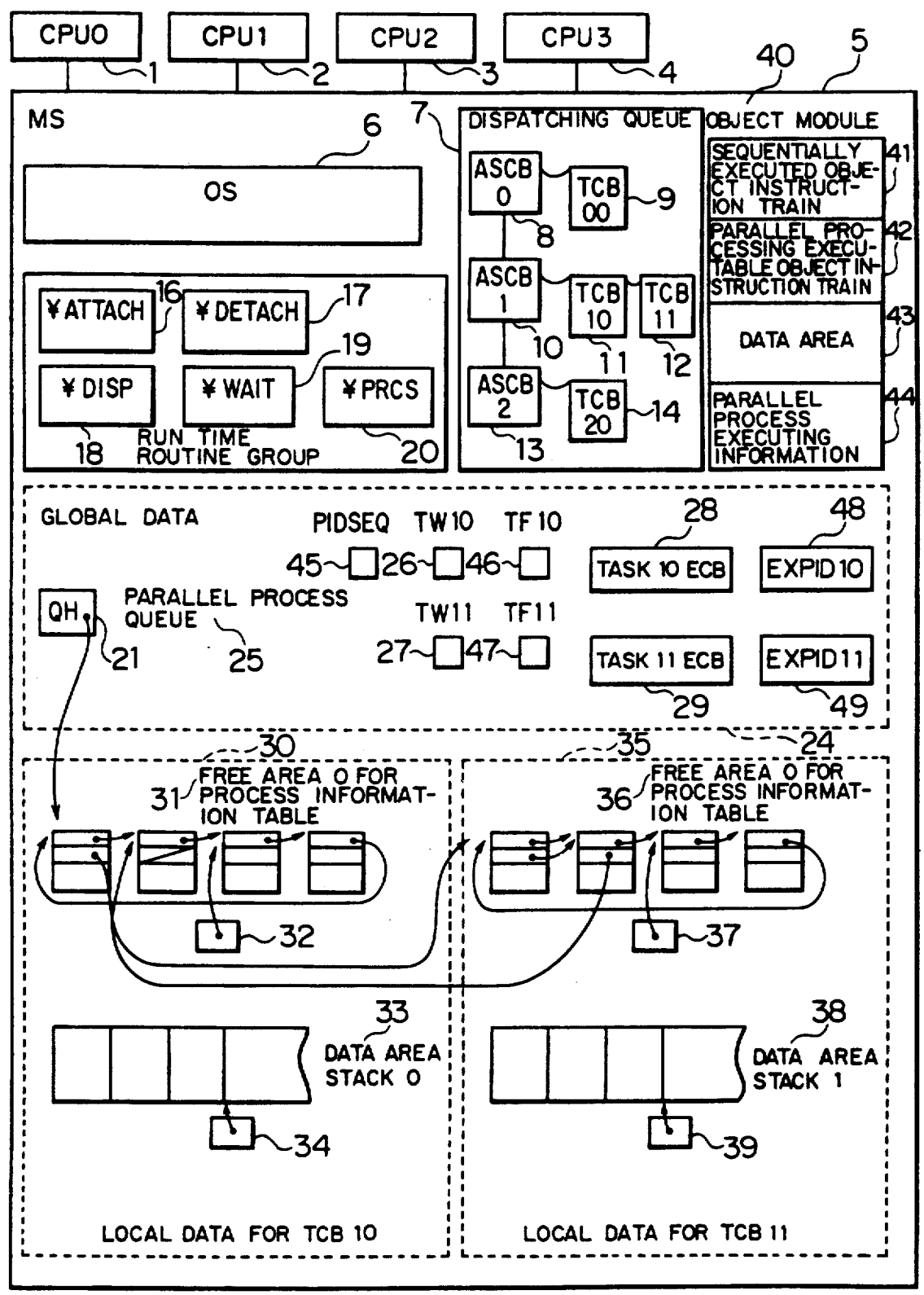
FIG. 10 is a schematic diagram showing the outline of the process distribution method according to a second embodiment of this invention.

FIG. 10 shows the overall arrangement of this system. The different points from that shown in FIG. 1 are that there are additionally provided task flags (TF 10, TF 11) 46 and 47, a process ID sequence number PID-SEQ 45 used when the routine ¥DISP 18 assigns a specific process number to each sub-process of an entire job at the time when the process information table is generated, and a process ID field (EXPID i) 48, 49 provided for each task for holding the process number of a process under execution of the routine ¥WAIT 19 by each task. The field (EXPID i) 48, 49 is set with "0" when the routine ¥WAIT 19 is not being executed. In the routine ¥WAIT 19, a change in not the flag 146 or the start address QH 21 but the task flag TFi 46, 47 is waited, as shown in FIG. 9A and 9B.

The object module to be generated by the compiler is the same as that shown in FIG. 2.

The OS 6 generates a user space (ASCB 1) 10 and a main task TCB 10, 11, similar to the case shown in FIG. 1. A main program starts being executed by the main task (TCB 10) 11. In the prolog process, the same run time routine ¥ATTACH 16 as described with FIG. 6 is called to generate a sub-task (TCB 11) 12. The sub-task (TCB 11) 12 executes the run time routine ¥PRCS 20 which waits for a generation of a new sub-process and, when it is generated, picks up the sub-process to execute it. In the routine ¥PRCS 20, the completion of a child-process is informed to the flag 146, as described with FIGS. 8A and 8B. In addition, when a task is executing a parent process which is in turn executing the routine ¥WAIT 19, this is informed to the task flag TFi 46, 47 corresponding to the task. Whether or not the routine ¥WAIT 19 is being executed by a parent process in the task, is checked by referring to the ID field (EXPID i) 48, 49.

When the main process to be executed after the prolog process 65 comes immediately before the parallel executable part, the run time routine ¥DISP 18 is called to generate the table 149, to register the table in the queue 25, and to notices the registration of the table 149. In the routine DISP 18, in addition to the process described with FIG. 7, the processes for assigning a process number to each sub-process and for noticing the registration of the table 149 for a process waiting for a change in the task flag TFi 46, 47 while executing the routine ¥WAIT 19 are executed.

The structure of the free area 31, 36 for generation of the table 149 and the structure of the queue 25 are the same as shown in FIG. 1.

After the execution of the routine ¥DISP 18, the main process calls the run time library ¥WAIT 19 for waiting for the completion of all child processes or the registration of a new process information table in the queue 25. In the routine ¥WAIT 19, a change in not the flag 146 or the start address QH 21 but the task flag TFi 46, 47 is waited, as shown in FIG. 9A and 9B.

After the completion of the routine ¥WAIT 19, the main process restarts to execute the sequentially executed object. In the epilog process 69, the same run time routine ¥DETACH 18 as described with FIG. 6 is called to delete the generated sub-task (TCB 11) 12, to thereafter end the main program.

The data area 33, 38 is used for reserving a work data area necessary for the execution of parallel processes, and has its stack pointer 34, 39. The OS 6 generates another user space (ASCB 0, ASCB 2) 8, 13 and a task (TCB 00, TCB 20) 9, 14 executed in the corresponding space 8, 13, when this job is to be executed in a multi-job environment.

The process for a case where a task k (TCB k) executes the routine ¥DISP 18 will be described with reference to FIG. 12, while referring to the contents of the process information table 149 shown in FIG. 11.

Figure 11:
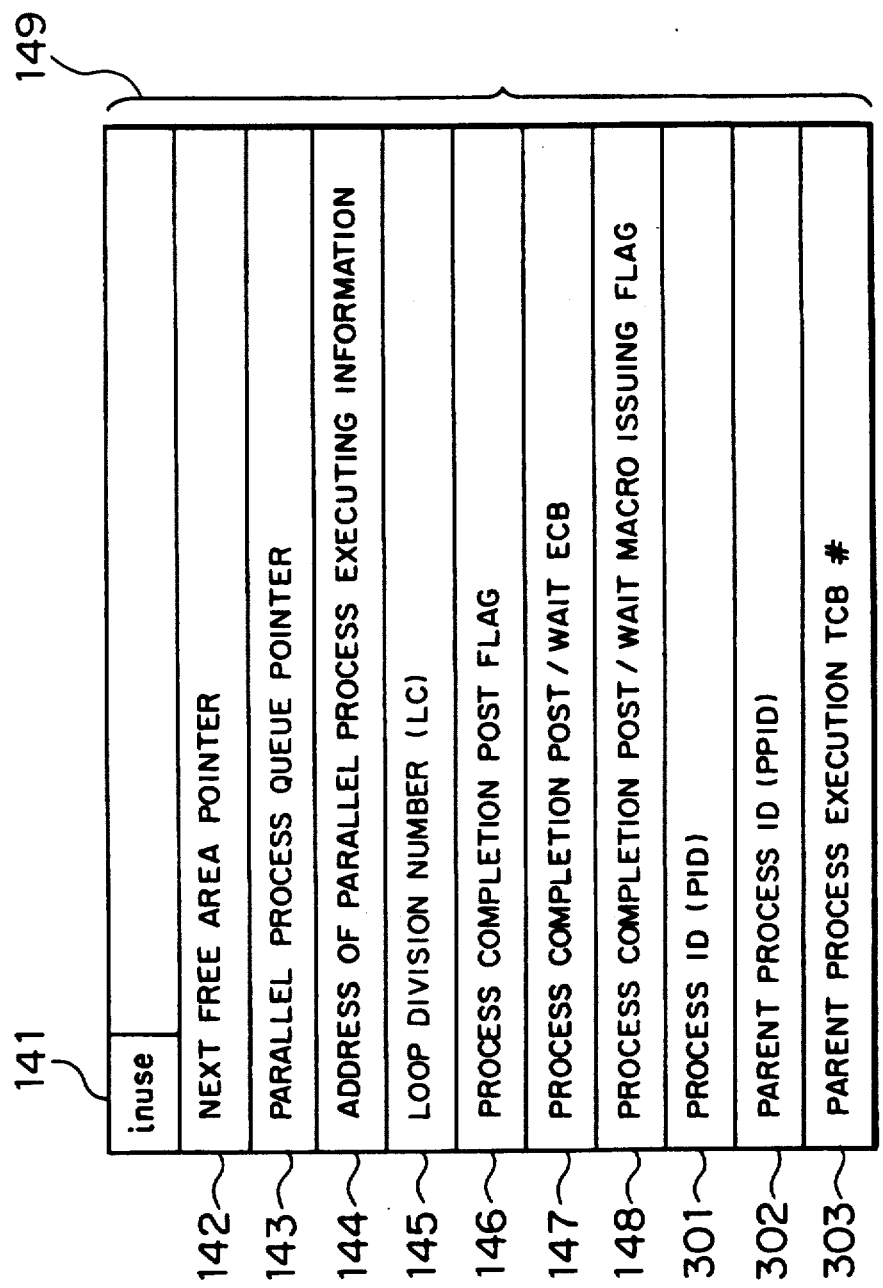
FIG. 11 shows the structure of a process information table according to the second embodiment.

The meanings, set contents, and setting timings of the in use bit 141, the next free area pointer 142, and the parallel process queue pointer 143, respectively shown in FIG. 11 are the same as shown in FIG. 5.

Figure 12:
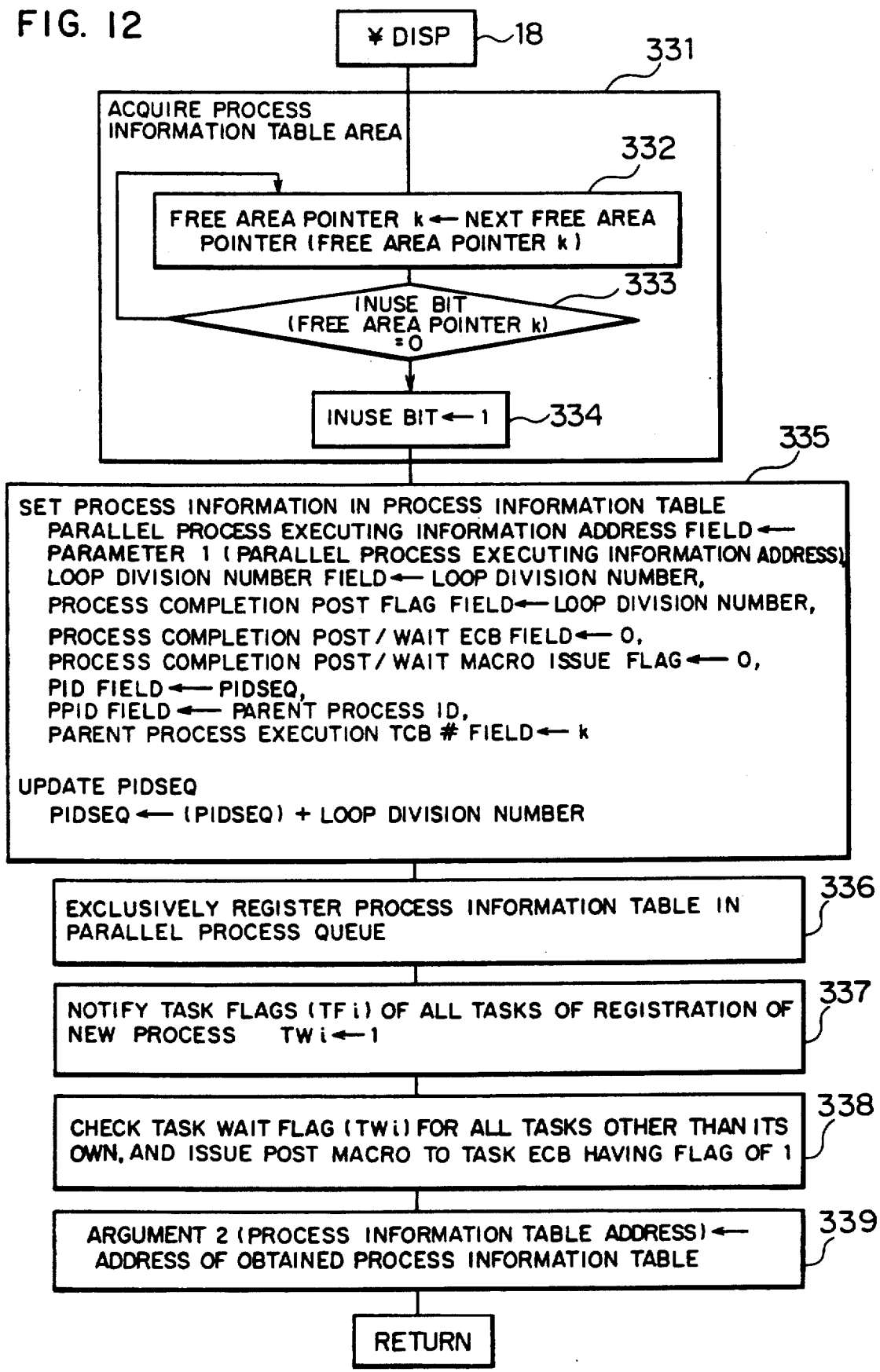
FIG. 12 illustrates how the run time routine ¥DISP for parallel processing of the second embodiment is executed.

At step 331 in FIG. 12, an area for process information table is reserved from the process information table free area for the task k (TCB k). The contents of associated steps 332 to 334 are the same as steps 162 to 164 shown in FIG. 7.

At step 335, the information necessary for the execution of parallel processes determined at the time of the execution is set in the reserved area for the table 149. The meaning and storage contents are the same as those shown in FIG. 5, and the setting values are the same as those set at step 165 in FIG. 7, as for the parallel process execution address 144, the loop division number LC 145, the process completion post flag 146, the process completion post/wait ECB 147, and the process completion post/wait macro issue flag 148.

A process ID 301 is used to assign a specific process number to each sub-process of the entire job. During the execution of the routine ¥DISP 18, it gives the process ID sequence number PIDSEQ 45 (FIG. 10). When a sub-process is fetched by the routine ¥PRCS 20 or ¥WAIT 19, the process ID 301 is read and added to a subtracted LC value, the added result being stored in the reserved work data area 33, 38 to thereby ensure the specific process number for each sub-process of the job. The sequence number PIDSEQ 45 is updated by adding thereto the number of sub-processes to be generated based on the table 149 being generating, i.e., the loop division number, so that the same process number will not be assigned to each sub-process of the job.

Assigning a process number will be described taking as an example the case where the processes shown in FIG. 4 are generated and executed. The main process is assigned with a process number "1" as a standard value. The routine ¥DISP 93 executed by the main process 1 81 gives "2" to the process ID 301, and the value "2" in PIDSEQ 45 is added with the loop division number "3" to thereby update the value in PIDSEQ 45 to "5". When a child process of the main process 1 81 is fetched by the routine ¥PRCS or ¥WAIT 97, 109, 121, the LC value is added to "2" to thereby generate the sub-processes 2, 3, and 4 82, 85, 88 having the process numbers "2", "3", and "4", respectively. When the routine ¥DISP 99 is executed earlier by the sub-process 2 82 than the sub-processes 3 and 4 85, 88, the routine ¥DISP 99 executed by the sub-process 2 82 gives the value "5" of the sequence number PIDSEQ 45 to the process ID 301 so that when the value "7" added with the loop number "2" is given to the sequence number PIDSEQ 45, the sub-processes 5 and 6 83, 84 are generated. In the similar manner, upon executing of the routine ¥DISP 11 123 by the sub-process 3, 4, a specific process number is assigned to each sub-process of the job. Lastly, a value "11" is stored in the sequence number PIDSEQ 45.

A process number in the work data area 33, 38 of a process which has called the routine ¥DISP 18 is read and given to a parent process number PPID 302 shown in FIG. 11. A task number k executing the routine ¥DISP 18 is given to a parent process execution TCB #303. A sub-process generated based on the table 149 finds a process number of the parent process to which completion of execution is to be noticed by referring to the PPID 302, and compares with a value in the execution process IDk 48, 49 of the task k indicated by the parent process execution TCB #303 to thereby judge whether or not a notice of completion of a child process is given to the task flag TFk 46, 47 of the task k. The above control is carried out so as not to give a notice of completion of a child process to an irrelevant process, because the task k does not execute only the process calling the routine ¥DISP 18.

Similar to step 166 shown in FIG. 7, the table 149 with values being set is exclusively registered in the queue 25.

At step 337, the registration of the table 149 is notified to other tasks waiting for a generation of a new sub-process or completion of a child process while referring to the task flag TFi 46, 47, the other tasks including those having the execution process ID field 48, 49 being set with other than "0". The reason why the process shown in FIG. 7 does not require the above operation is as follows. The routine ¥WAIT 19 waits for a generation of a sub-process while referring to the start address QH 21, and when the table 149 is registered in the queue 25 at step 166, then the value of the start address QH 21 automatically changed.

Similar to step 167 in FIG. 7, at step 338 the POST macro is issued to the task issuing the WAIT macro, to thereby notifying the task of a registration of a new table 149.

Similar to step 138 in FIG. 7, a step 339 the start address of the obtained table 149 is returned to the second argument PTBL to thereafter end the routine ¥DISP 18.

Figure 13A:
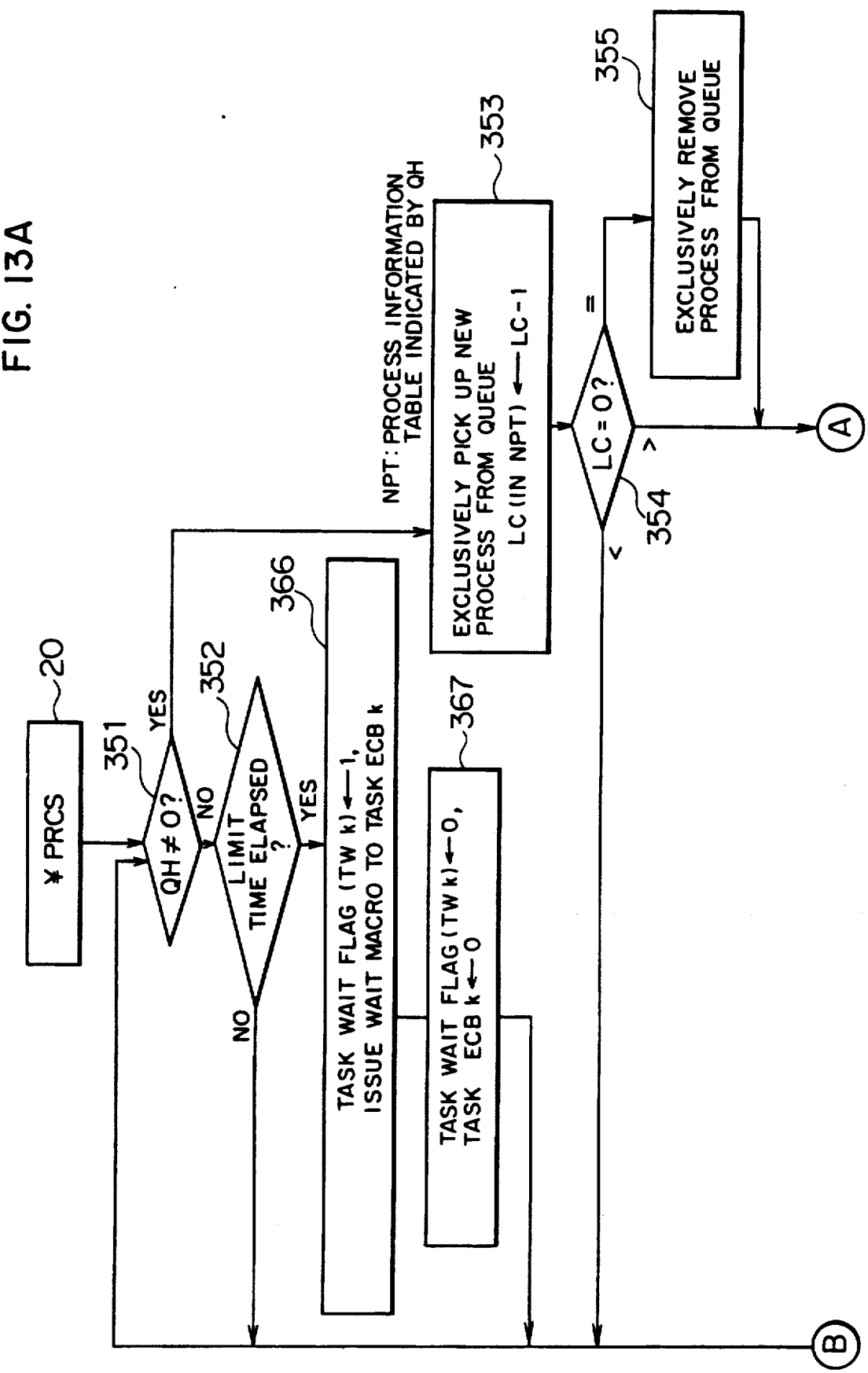
FIGS. 13A and 13B illustrate how the run time routine ¥PRCS for parallel processing of this embodiment is executed.
Figure 13B:
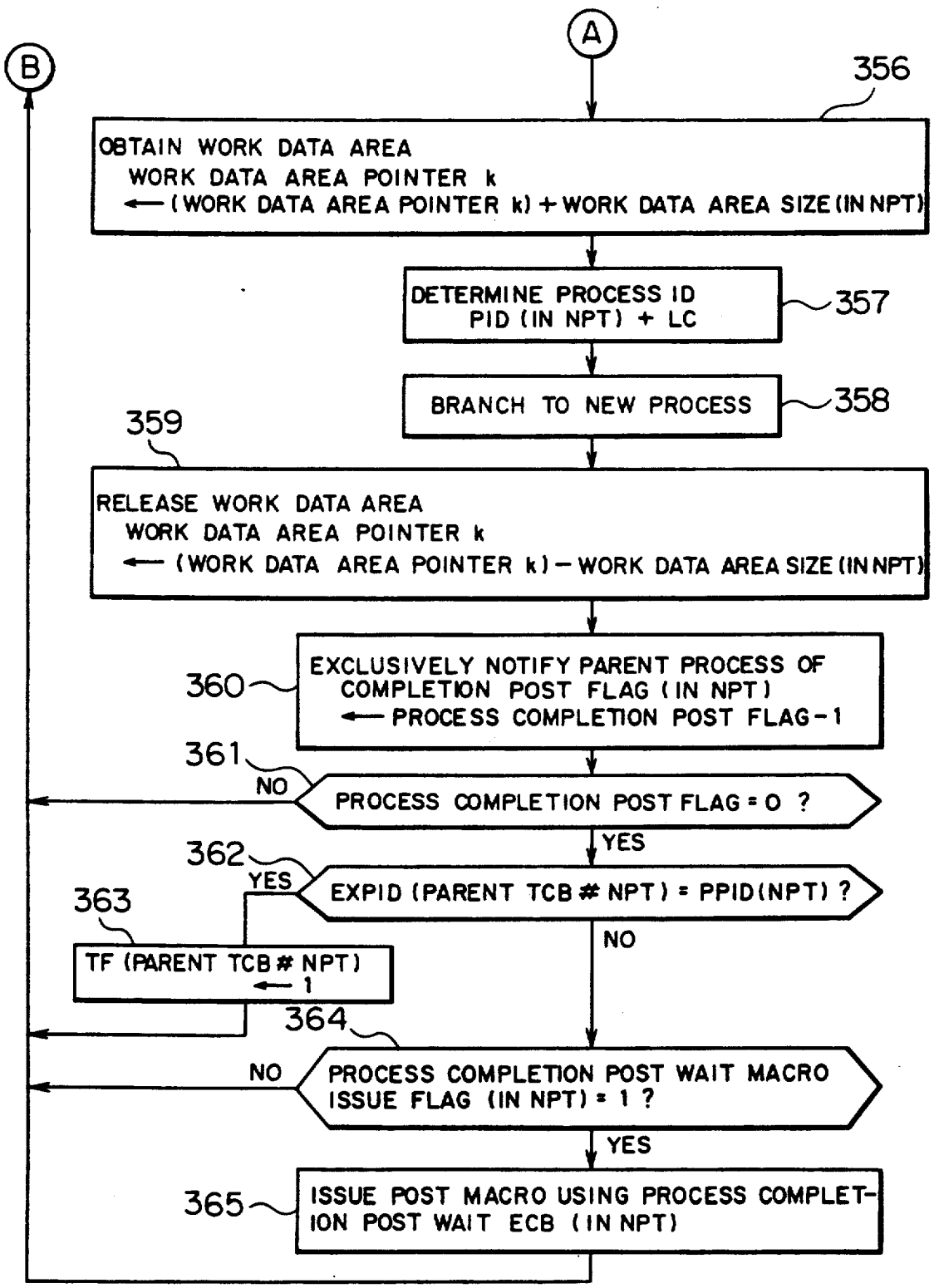

Next, the process for the case where a task k (TCB k) executes the routine ¥PRCS 20 will be described with reference to FIGS. 13A and 13B.

Figure 8A:
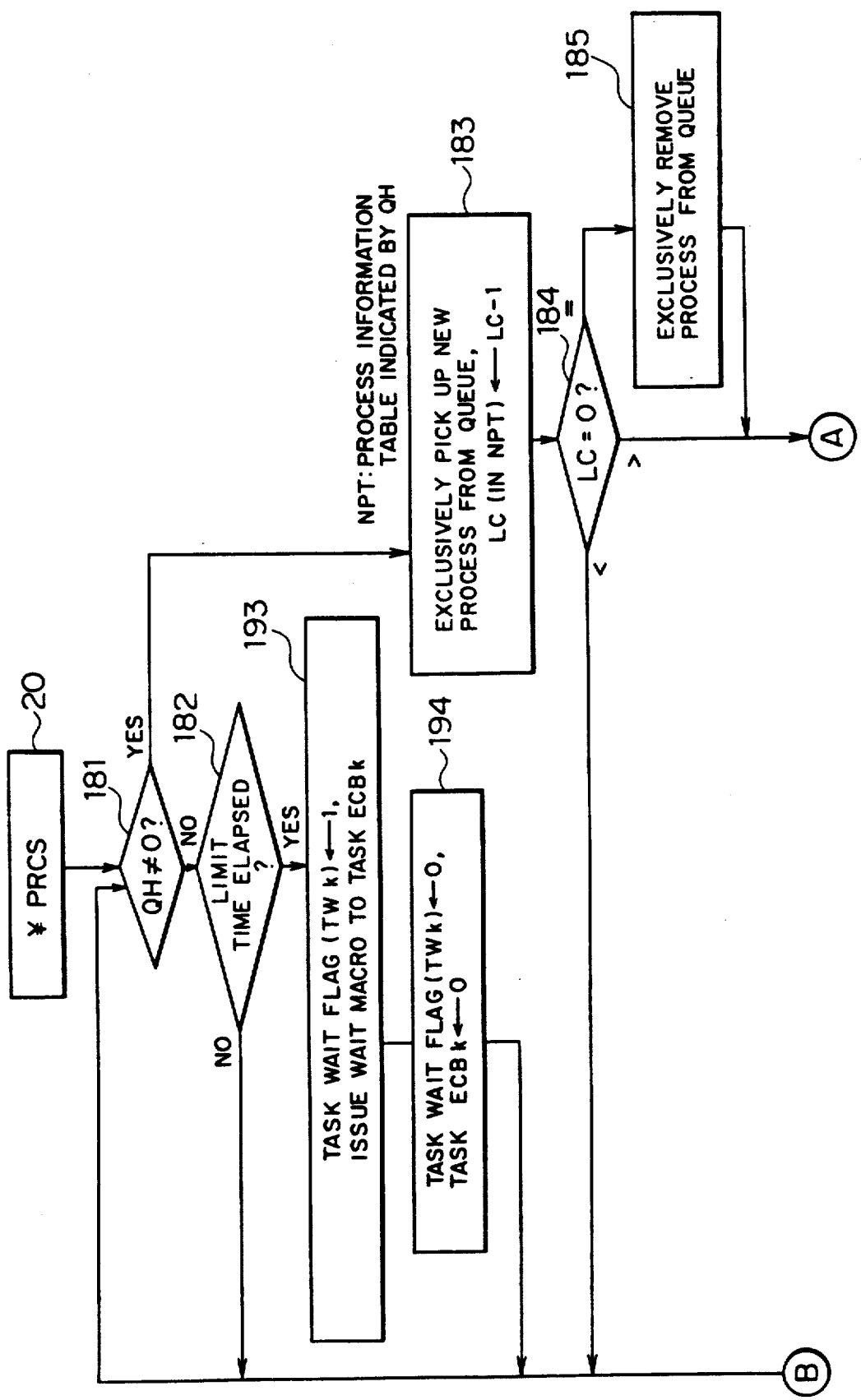
FIGS. 8A and 8B illustrate how the run time routine ¥PRCS for parallel processing of this embodiment is executed.

Similar to step 181 in FIG. 8A, at step 351 it is checked whether or not the start pointer QH 21 is "0". If not, steps 353 to 365 are executed. That the start pointer QH 21 is not "0" means that the table 149 is present in the queue 25.

Figure 8B:
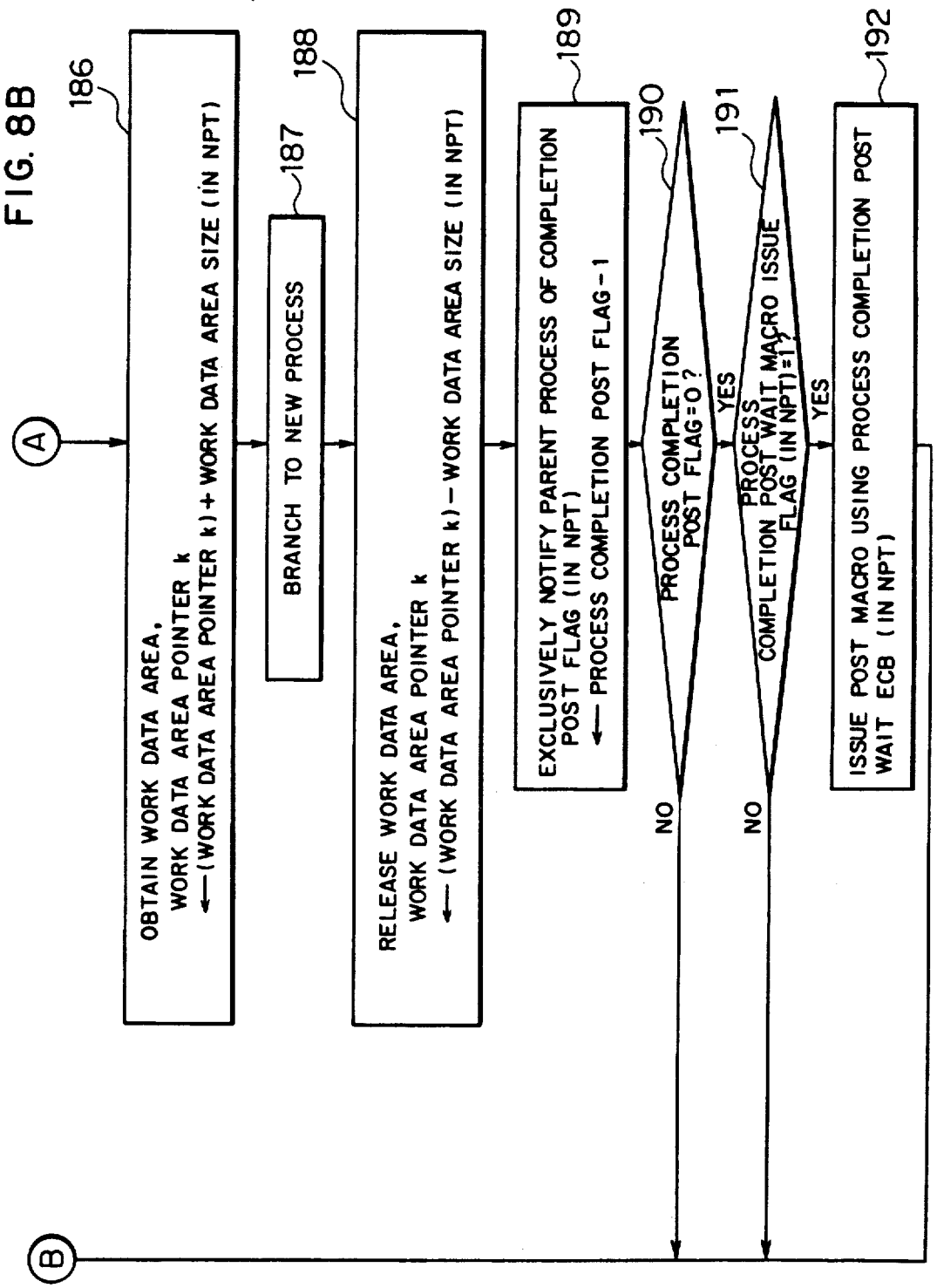

Similar to steps 183 to 186 of FIGS. 8A and 8B, at steps 353 to 356 a sub-process is exclusively derived from the table 149 indicated by the start pointer QH 21. If necessary, the table 149 is removed from the queue 25, and the work data area having the size indicated by the work data area size 72, 75 is reserved within the local data area 30, 35.

At step 357 the value read from the process ID 301 of the table 149 is added to the decremented LC value to determine the process number which is then stored in the obtained work data area 33, 438.

Similar to steps 187 to 188 in FIG. 8B, at steps 358 to 359 the routine branches to the parallel process object start address to execute the sub-process, and thereafter the reserved work data area 33, 38 is released.

At steps 360 to 365 completion of child processes is noticed to the parent process. Similar to step 189 in FIG. 8B, at process 30 a notice of completion of child processes is carried out by exclusively decrementing by one the value of the flag 146 of the table 149. At step 361 it is checked whether or not the decremented flag 146 is "0", i.e., whether or not the child process is the last executed one of all child processes. If the flag is "0" indicating the last executed child process, step 362 is executed to check whether or not the task is executing the parent process and the routine ¥WAIT 19 is being executed. To this end, it is checked whether or not the value of the execution process ID EXPID 48, 49 for the task indicated by the parent process execution TCB #303 of the table 149 is equal to the value of the parent process ID 302. If both the values are equal to each other, it means that the parent process of a certain task is executing the routine ¥WAIT 19. Therefore, step 363 is executed to set "1" in the task flag 46, 47 of the task to notify completion of all child processes to thereafter again execute step 251.

If both the value are not equal, it means that the parent process is not executing the routine ¥WAIT 19. Therefore, step 364 is executed to check whether or not the flag 148 is "1", i.e., whether or not the parent process issued the WAIT macro. If the flag is "1" indicating issue of the WAIT macro, step 365 is executed to issue the POST macro to the parent process by using as a communication area the ECB 147 of the table 149 to thereafter execute step 351 again. If the flag is not "1" at step 364, it is not necessary to issue the POST macro to the parent process so that step 351 is again executed.

If the start address QH 21 of the queue 25 is "0" at step 351, similar to steps 181 to 182 in FIG. 8A, steps 351 to 352 are repeated until a new table 149 is registered in the queue 25 and the start address QH 21 takes other than "0", or until a limit time period has elapsed. When the limit time period has elapsed, the task wait flag TWk 26, 27 of the task indicating that the WAIT macro is being issued, is set with "1", and the WAIT macro is issued by using as the communication area the task k ECB 28, 29. In the routine ¥PRCS 20, the start address QH 21 is referred directly without referring to the task flag TFk because there is only one event to be waited.

A generation of a new table 149 is informed to the task k ECB 28, 29 to restart the execution of the routine ¥PRCS 20 at step 367. Similar to step 194 in FIG. 8A, at step 367 the task wait flag TWk 26, 27 and the task k ECB 28, 29 are set with "0" for preparing for a re-use to thereafter execute step 351 again.

Figure 14A:
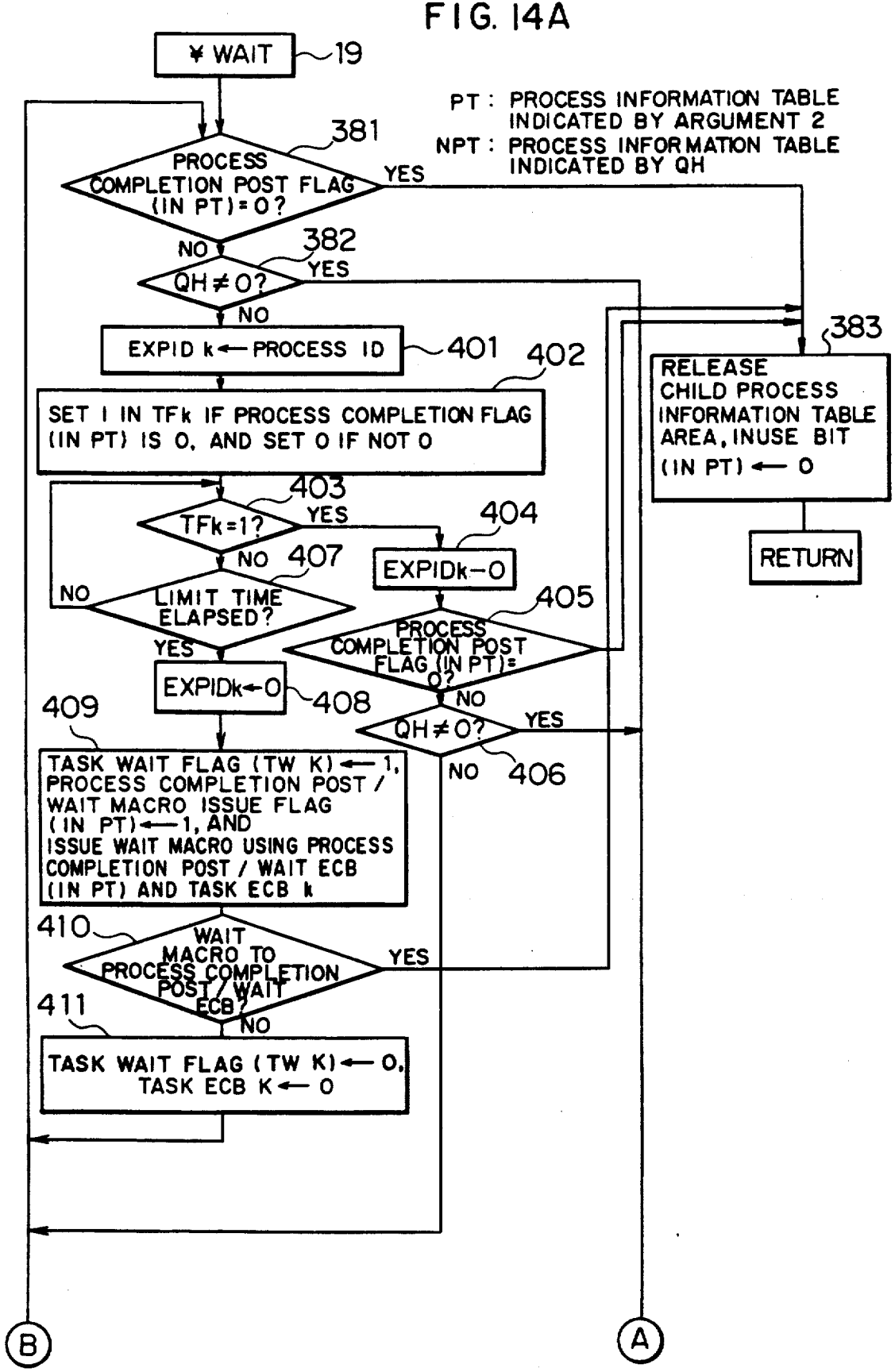
Figure 15:
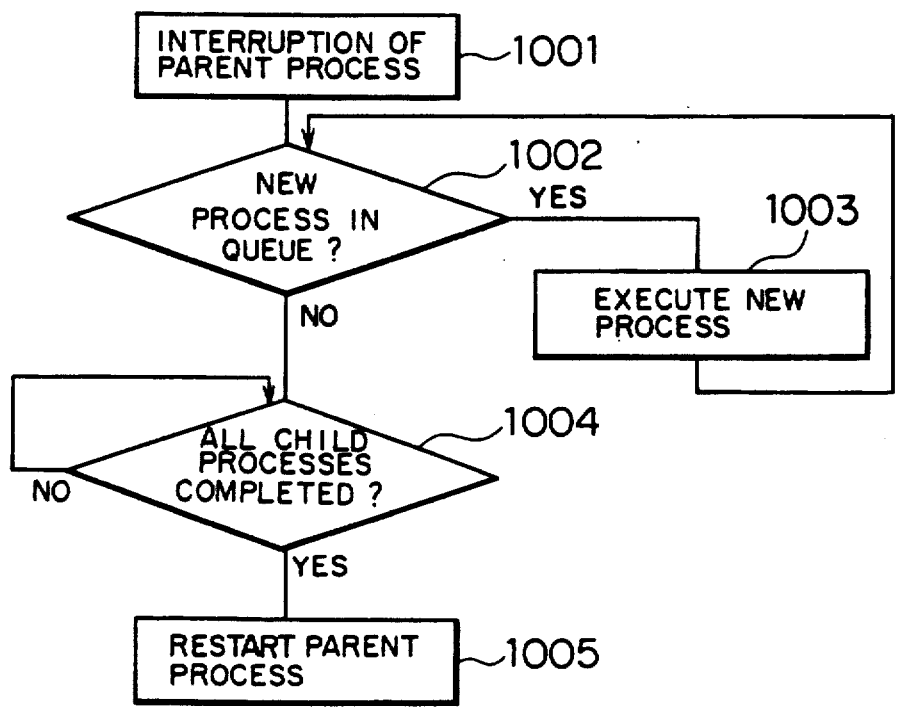
FIG. 15 is a flow chart illustrating a conventional technique.

Next, the process of executing the routine ¥WAIT 19 by a task k (TCB k) will be described with reference to FIGS. 14A and 14B.

It is checked at step 381 whether or not the flag 146 of the table 149 is "0", i.e., whether or not all generated child processes have been completed. If completed, at step 383 the in-use bit 141 of the table 149 is set to be "0" to release the process information table area and end the execution of the routine ¥WAIT 19 for the case where the task k executes later the routine ¥DISP 18. When there is still present a child process not executed at step 381, it is checked at step 382 whether or not the start address QH 21 is "0", i.e., whether or not the table 149 is present in the queue 25. If present, a new process is executed at steps 384 to 396. The contents of steps 384 to 396 are the same as steps 353 to 365 of the routine ¥PRCS 20 shown in FIGS. 13.

If the table 149 is not present in the queue 25 at step 382, at steps 401 to 408 generation of a sub-process or completion of all child processes is waited for the predetermined time period while referring to the task flag TFk 46, 47.

At step 401, in order to indicate the process number of the parent process waiting while referring to the task flag TFk 46, 47, the process number of the parent process calling the routine ¥WAIT 19 is read from the work data area 33, 38 and set in the execution process ID EXPID k 48, 49.

An initial value is set in the task flag TF 46, 47 at step 402. The task flag TFk 46, 47 is set with "1" when all child processes are completed or a new sub-process is generated. Therefore, as the initial value, "1" is set when the value of the flag 146 is "0", i.e., all the child processes have been completed, and "0" is set when the flag 146 takes other than "0".

It is checked at step 403 whether or not any notice was given to the task flag TFk 46, 47. If a notice was given, step 404 is executed in order to indicate that occurrence of the event is not waited while referring to the task flag TFk 46, 47, and "0" is set in the execution process ID EXPID k 48, 49. Subsequently, step 405 is executed to check whether or not the flag 146 is "1", to thereby confirm whether or not the notice to the task flag TFk 46, 47 was effected by completion of all child processes. If the flag 146 is "1" indicating completion of all the child processes, step 383 is executed. If not, which means that the notice to the task flag TFk 46, 47 was effected by generation of a new sub-process, step 406 is executed to check whether or not the start address QH 21 is "0". If not "0" indicating that a table 149 has been registered, steps 384 to 396 are executed for fetching and executing the sub-process. If "0" indicating that another task has removed the registered table 149, step 381 is again executed.

When there is no notice to the task flag TFk 46, 47 at step 403, step 407 is executed to check whether or not the time period has elapsed. If the time period has not elapsed as yet, step 403 is repeated until completion of all the child processes or generation of a new sub-process is noticed to the task flag TFk 46, 47 during the time period.

If the time period has elapsed at step 407, step 408 is executed to indicate that occurrence of the event is not waited while referring to the task flag TFk 46, 47, and the execution process ID EXPID 48, 49 is set with "0". Thereafter, in order not to lower the system throughput, similar to step 225 in FIG. 9A, step 409 is executed to issue the WAIT macro and releases the CPU using right.

When a new sub-process is generated or all child processes have been executed, occurrence of such an event is notified to the task k ECB 28, 29 or the ECB 147, and the task k again obtains the CPU using right to execute the routine ¥WAIT 19 starting from step 410. At step 410 it is checked whether or not any notice was given to the ECB 147. If there was the notice, step 383 is executed to release the process information table area. If the notice was given to the task k ECB 28, 29, then step 411 is executed, and "0" is set to the task wait flag TWk 26, 27 and the task k ECB 28, 29 to thereafter execute step 381 again.

What is claimed is:

1. In a processor system for executing a plurality of tasks, which respectively control execution of one or more of a plurality of processes, a method of restarting execution of a first process which is under control of a particular one of said tasks after said first process is stopped to wait for occurrence of an event associated with at least one second process different from said first process, comprising steps executed by the particular task, the steps including:
   (a) detecting whether or note said event associated with said second process has occurred;
   (b) restarting execution of said first process when it is detected that said event has occurred;
   (c) determining whether or not there is an execution waiting process when said event has not yet occurred;
   (d) executing an executing waiting process when there is an execution waiting process; and
   (e) repeating said steps (a) to (d) after completion of the execution of said execution waiting process when there is an execution waiting process or after said step (c) when there is no execution waiting process.

2. A method according to claim 1, wherein said step (e) includes the step of repeating said steps (a) to (d) two or more times in a state that said event has not yet occurred.

3. A method according to claim 1, wherein said step (e) includes the step of repeating said steps (a) to (d) one or more times in a state that said event has not yet occurred but one or more execution waiting processes are present and until there remains no execution waiting process.

4. A method according to claim 3, wherein said step (e) further includes the step of repeating said steps (a) to (d) at least once in a state that said event has not yet occurred and there is no execution waiting process.

5. A method according to claim 3, wherein said step (e) further includes the step of repeating said steps (a) to (d) one or more times in a state that said event has not yet occurred and no execution waiting process is present, and until a predetermined upper limit on an elapsed time period or on a number of repetitions is reached.

6. A method according to claim 5, further comprising the step of predetermining said upper limit by said first process.

7. A method according to claim 6, wherein said predetermining step comprises the step of predetermining said upper limit by said first process, dependent on a time necessary for execution of said second process.

8. A method according to claim 1, further comprising the step of temporally stopping execution of said particular task after said step (e).

9. A method according to claim 8, wherein each of said plurality of tasks acquires a using right of a processor of said processor system from an operating system for managing said processor system before said each task is executed, and
said temporally stopping step includes the step of requesting to said operating system deprivation of a processor using right from said particular task.

10. A method according to claim 9, wherein said step (e) includes the steps of:
repeating said steps (a) to (d) one or more times in a state that said event has not yet occurred but one or more execution waiting processes are present, and until there remains no execution waiting process; and
repeating said steps (a) to (d) one or more times in a state that s id event has not yet occurred and no execution waiting process is present, and until a predetermined upper limit on the elapsed time period or on a number of repetitions is reached, and
wherein said requesting step comprises the step of requesting the deprivation to said operating system when said upper limit is reached.

11. A method according to claim 1, wherein said second process is a child process generated by said first process and said event is completion of execution of said second process.

12. A method according to claim 11, wherein said first process already generated a plurality of child processes and said event is completion of execution of all the child processes.

13. A method according to claim 1, wherein said step (c) comprises the step of determining whether or not there is an execution waiting process which is generated by any of said particular task and tasks other than said particular task.

14. A method according to claim 13, wherein each of said plurality of tasks belongs to a corresponding one of a plurality of jobs, each job is executed by one or more of said plurality of tasks, and said tasks other than said particular task belong to a job to which said particular task belongs.

15. A method according to claim 1, wherein each of said plurality of tasks belongs to one of a plurality of jobs, each job is executed by one or more of said plurality of tasks, and said step (c) comprises the step of determining whether or not there is an execution waiting process to be executed by one or more tasks belonging to a job to which said particular task belongs.

16. A method according to claim 15, wherein said processor system is a multi-processor system comprising a plurality of processors tightly coupled, one or more tasks belonging to each job are executed by one or more of said plurality of processors, each of which executes in parallel tasks assigned to an identical job or different jobs, and
wherein said step (c) comprises the step of determining whether or not there is an execution waiting process to be executed by any of one or more tasks which belong to the job to which said particular task belongs and which are being executed respectively by ones of said plurality of processors.

17. A method according to claim 16, further comprising the step of temporally stopping execution of said particular task after said step (e), and wherein each of said plurality of tasks acquires a using right of a corresponding one of the processors from an operating system for managing said processor system before said each task is executed, and said temporally stopping step comprises the step of requesting to said operating system deprivation of a using right of a processor executing said particular task from said particular task.

18. A method according to claim 1, wherein said step (a) comprises the step of judging from a content of an event occurring flag whether or not said event has occurred, said event occurring flag storing information which represents that said event has occurred in association with said second process.

19. A method according to claim 1, wherein said step (c) comprises the step of determining from a content of a waiting process flag whether or not there is an execution waiting process, said waiting process flag storing first information when a process is generated and registered in a wait queue by a process which is controlled by said particular task or by another task in a state that an execution waiting process has not been present in said wait queue and said waiting process flag storing second information when all execution waiting processes have been taken out of said wait queue.

20. A method according to claim 1, wherein said step (a) comprises the step of detecting from a content of an event occurring flag whether or not said event has occurred, said event occurring flag storing information which represents that said event has occurred in association with said second process, and
said step (c) comprises the step of determining from a content of a waiting process flag whether or not there is an execution waiting process, said waiting process flag storing first information when a process is generated and registered in a wait queue by a process which is controlled by said particular task or by another task in a state that no execution waiting process is present in said wait queue, and said waiting process flag storing second information when all execution waiting processes have been taken out of said wait queue.

21. A method according to claim 20, further comprising the steps of:
(f) judging a combination flag before initial execution of said steps (a) to (d) and re-execution of said steps (a) to (d) in said step (e), said combination flag storing predetermined information either when said event has occurred in association with said second process or when an execution waiting process is newly registered in said wait queue in a state that no execution waiting process is present in said wait queue;
(g) repetitively judging said combination flag when a content of said combination flag is not said predetermined information; and (h) allowing said initial execution or said re-execution of said step (a) when it is judged in said step (f) or (g) that the content of said combination flag is said predetermined information.

22. A method according to claim 21, wherein said steps (f) to (h) are repeated a number of times in a state that the content of said combination flag is said predetermined information so that re-execution of said steps (a) to (d) is allowed in that state.

23. A method according to claim 21, wherein said steps (f) to (h) are repeated a number of times in a state that said combination flag is said predetermined information, so that re-execution of said steps (a) to (d) is allowed a number of times in that state.

24. A method according to claim 23, wherein said steps (f) to (h) are further repeated at least once in a state that the content of said combination flag is not said predetermined information any more, before subsequent check of allowability of re-execution of the steps (a) to (d).

25. A method according to claim 21, wherein said step (g) is repeated one or more times in a state that the content of said combination flag is not said predetermined information, and until a predetermined upper limit on an elapsed time period or an a number of repetitions is reached.

26. A method according to claim 25, further comprising the step of predetermining said upper limit by said first process.

27. A method according to claim 26, wherein said predetermining step comprises the step of predetermining said upper limit by said first process, dependent on a time necessary for execution of said second process.

28. A method according to claim 21, further comprising the step of temporally stopping execution of said particular task when the content of said combination flag is not said predetermined information.

29. A method according to claim 28, wherein each of said plurality of tasks acquires a using right of a processor of said processor system from an operating system for managing said processor system before said each task is executed, and said temporally stopping step comprises the step of requesting to said operating system deprivation of a processor using right from said particular task.

30. A method according to claim 29, wherein said step (f) to (h) are repeated one or more times to repeat said step (a) in a state that the content of said combination flag is said predetermined information so that said steps (a) to (d) are allowed to be re-executed repeatedly, said step (g) is repeated one or more times until said upper limit is reached in a state that the content of said combination flag is not said predetermined information, and said requesting step is executed when said upper limit has been reached.

31. A method according to claim 21, wherein said second process is a child process generated by said first process and said event is completion of said second process.

32. A method according to claim 31, wherein said first process has generated a plurality of child processes and said event is completion of execution of all the child processes.

33. A method according to claim 21, wherein said step (c) comprises the step of determining whether or not there is an execution waiting process which is generated by any of said particular task and tasks other than said particular task.

34. A method according to claim 33, wherein each of said plurality of tasks belongs to a corresponding one of a plurality of jobs, each job is executed by one or more of said plurality of tasks, and said tasks other than said particular task belong to a job to which said particular task belongs.

35. A method according to claim 21, wherein each of said plurality of tasks belongs to a corresponding one of a plurality of jobs, each job is executed by one or more of said plurality of tasks, and said step (c) comprises the step of determining whether or not there is an execution waiting process to be executed by one or more of said plurality of tasks belonging to a job to which said particular task belongs.

36. A method according to claim 35, wherein said processor system is a multi-processor system comprising said plurality of processors tightly coupled, one or more tasks belonging to each job are executed by one or more of said plurality of processors, each of which executes in parallel tasks assigned to an identical job or different jobs, said step (c) comprises the step of determining whether or not there is an execution waiting process to be executed by one of one or more tasks which belong to the job to which said particular task belongs and which are being executed respectively by corresponding ones of said plurality of processors.

37. A method according to claim 36, further comprising the step of temporally stopping execution of said particular task after execution of said step (g), and wherein each of said plurality of tasks acquires a using right of a corresponding processor of said processor system from an operating system for managing said processor system before said each task is executed, and wherein said temporally stopping step comprises the step of requesting to said operating system deprivation of a processor using right from said particular task.

* * * * *